United States Patent
Machida et al.

(10) Patent No.: US 11,028,302 B2
(45) Date of Patent: Jun. 8, 2021

(54) COLD STORAGE MEDIUM

(71) Applicant: Panasonic Corporation, Osaka (JP)

(72) Inventors: Hironobu Machida, Nara (JP);
Motohiro Suzuki, Osaka (JP)

(73) Assignee: PANASONIC CORPORATION, Osaka (JP)

(\*) Notice: Subject to any disclaimer, the term of this patent is extended or adjusted under 35 U.S.C. 154(b) by 48 days.

(21) Appl. No.: 16/703,316

(22) Filed: Dec. 4, 2019

(65) Prior Publication Data
US 2020/0102485 A1 Apr. 2, 2020

Related U.S. Application Data

(63) Continuation of application No. PCT/JP2019/000137, filed on Jan. 8, 2019.

(30) Foreign Application Priority Data

| Jan. 29, 2018 | (JP) | JP2018-012125 |
| Mar. 8, 2018 | (JP) | JP2018-041475 |
| Oct. 22, 2018 | (JP) | JP2018-198020 |

(51) Int. Cl.
*C09K 5/06* (2006.01)

(52) U.S. Cl.
CPC ............... *C09K 5/066* (2013.01); *C09K 5/06* (2013.01); *C09K 5/063* (2013.01)

(58) Field of Classification Search
CPC .......... C09K 5/066; C09K 5/06; C09K 5/063; C09K 5/08; C09K 5/02; C09K 5/00
See application file for complete search history.

(56) References Cited

U.S. PATENT DOCUMENTS

| 3,244,627 A * | 4/1966 | Smith | C09K 5/08 508/249 |
| 3,345,199 A * | 10/1967 | Fitch | C23C 18/02 427/229 |
| 5,013,482 A * | 5/1991 | O'Neil | C07C 59/125 252/395 |

(Continued)

FOREIGN PATENT DOCUMENTS

| JP | 2007-277443 | 10/2007 |
| JP | 2012-025791 | 2/2012 |

(Continued)

OTHER PUBLICATIONS

Machida et al. "Preparation of dispersed metal nanoparticles in the aqueous solution of metal carboxylate and the tetra-n-butylammonium carboxylate", Journal of Crystal Growth, 514, 2019, 14-20. (Year: 2019).*

(Continued)

*Primary Examiner* — Jane L Stanley
(74) *Attorney, Agent, or Firm* — McDermott Will & Emery LLP

(57) ABSTRACT

Provided is a cold storage medium according to the present invention contains tetra-n-butylammonium ions, silver ions, at least one kind of halide ions selected from the group consisting of fluoride ions, chloride ions, and bromide ions, water, and at least one kind of carboxylic acid ions each represented by the following chemical formula R—COO⁻ (where R represents a hydrocarbon group).

13 Claims, 2 Drawing Sheets

(56) References Cited

U.S. PATENT DOCUMENTS

| | | | | |
|---|---|---|---|---|
| 5,785,885 | A * | 7/1998 | Kakiuchi | C09K 5/066 252/70 |
| 5,916,477 | A * | 6/1999 | Kakiuchi | C09K 5/063 252/70 |
| 6,262,129 | B1 * | 7/2001 | Murray | B01J 35/0013 106/1.27 |
| 9,650,554 | B2 * | 5/2017 | Suito | C09K 5/063 |
| 2005/0139802 | A1 * | 6/2005 | Maes | C09K 5/063 252/70 |
| 2012/0199171 | A1 * | 8/2012 | Watts | C09K 5/10 136/205 |
| 2017/0342305 | A1 * | 11/2017 | Toyama | C08K 3/08 |
| 2020/0399516 | A1 * | 12/2020 | Narahara | B65D 81/3816 |

FOREIGN PATENT DOCUMENTS

| | | | | |
|---|---|---|---|---|
| JP | 2017-003182 | | 1/2017 | |
| JP | 2018-059676 | | 4/2018 | |
| JP | 2018-184565 | | 11/2018 | |
| JP | 2020-147718 A | * | 9/2020 | C09K 5/06 |
| KR | 2008-0029826 A | * | 4/2008 | C07F 1/10 |
| WO | 2016/075941 | | 5/2016 | |
| WO | 2018/198848 | | 11/2018 | |

OTHER PUBLICATIONS

International Search Report of PCT application No. PCT/JP2019/000137 dated Apr. 16, 2019.

Seungmin Lee et al., "Phase Equilibria of Semiclathrate Hydrate for Nitrogen in the Presence of Tetra-n-butylammonium Bromide and Fluoride", Journal of Chemical & Engineering Data, vol. 55, No. 12, 2010, pp. 5883 5886, Nov. 29, 2010.

Kai Sato, Hiroki Tokutomi, Ryo Ohmura, "Phase equilibrium of ionic semiclathrate hydrates formed with tetrabutylammonium bromide and tetrabutylammonium chloride", Fluid Phase Equilibria 337 (2013), pp. 115-118, Sep. 21, 2012.

* cited by examiner

COLD STORAGE MEDIUM

BACKGROUND

1. Technical Field

The present invention relates to a cold storage medium.

2. Description of the Related Art

Patent Literature 1 discloses a heat storage device and a heat storage method. In more detail, in the storage device disclosed in Patent Literature 1, overcooling of a heat storage material capable of forming a clathrate hydrate by cooling can be released with a smaller amount of energy.

CITATION LIST

Patent Literature

Patent Literature 1
Japanese Patent Laid-open Publication No. 2017-003182A

Non-Patent Literature

Non-Patent Literature 1: Seungmin Lee et. al., "Phase Equilibria of Semiclathrate Hydrate for Nitrogen in the Presence of Tetra-n-butylammonium Bromide and Fluoride", Journal of Chemical & Engineering Data, Vol. 55, No. 12, 2010, pp 5883-5886
Non-Patent Literature 2: Kai Sato. Hiroki Tokutomi, Ryo Ohmura, "Phase equilibrium of ionic semiclathrate hydrates formed with tetrabutylammonium bromide and tetrabutylammonium chloride", Fluid Phase Equilibria 337 (2013) 115-118

SUMMARY

An object of the present invention is to provide a cold storage medium which satisfies the following two requirements (I) and (II).

Requirement (I): In order to use suitably for a refrigerator, the cold storage medium has a melting point of not less than 3 degrees Celsius and not more than 10 degrees Celsius.

Requirement (II): The cold storage medium has a small supercooling degree $\Delta T$.

The cold storage medium according to the present invention contains:
tetra-n-butylammonium ions;
silver ions;
at least one kind of halide ions selected from the group consisting of fluoride ions, chloride ions, and bromide ions;
water; and
at least one kind of carboxylic acid ions each represented by the following chemical formula (I),

R—COO⁻           (I)

where R represents a hydrocarbon group.

The present invention provides a cold storage medium which satisfies the following two requirements (I) and (II).

Requirement (I): In order to use suitably for a refrigerator, the cold storage medium has a melting point of not less than 3 degrees Celsius and not more than 10 degrees Celsius.

Requirement (II): The cold storage medium has a small supercooling degree $\Delta T$.

The cold storage medium according to the present invention can be used suitably for a refrigerator.

DETAILED DESCRIPTION OF THE EMBODIMENT

Hereinafter, the embodiment of the present invention will be described with reference to the drawings.

Figure 1:
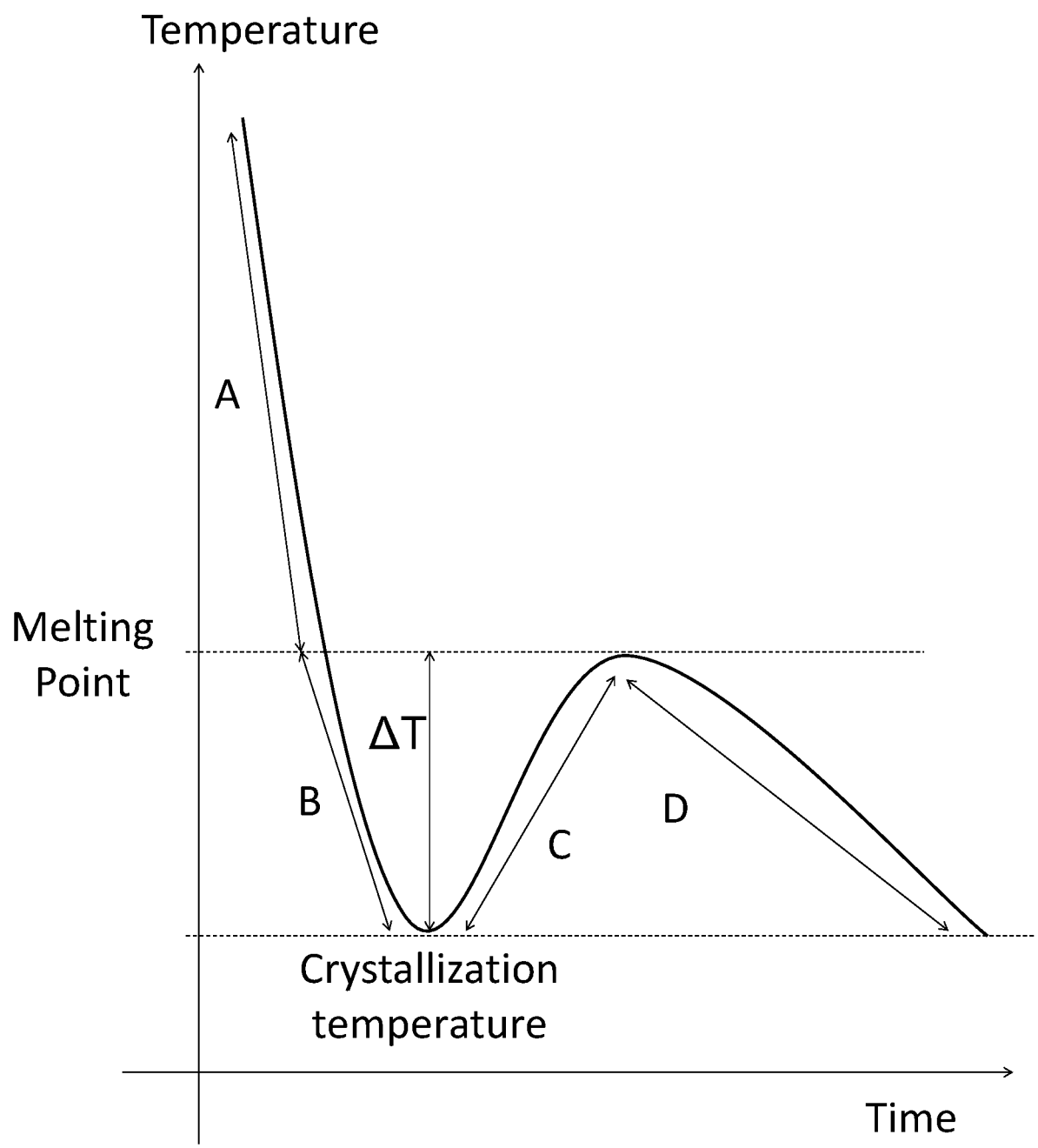
FIG. 1 is a graph showing a characteristic of a cold storage medium during a period of cooling.

FIG. 1 is a graph showing a characteristic of a cold storage medium during a period of cooling. In FIG. 1, a horizontal axis and a vertical axis indicate time and temperature, respectively.

The cold storage medium according to the present embodiment is cooled. See a section A included in FIG. 1. Unlike a case of a common liquid, as well known in the technical field of the cold storage medium, even when the temperature of the cold storage medium reaches the melting point thereof due to cooling of the cold storage medium, the cold storage medium is not be solidified but is in a supercooling state. See a section B included in FIG. 1. In the supercooling state, the cold storage medium is liquid.

Then, the cold storage medium begins to crystallize spontaneously. With the crystallization, the cold storage medium releases crystallization heat which is substantially equal to its latent heat. As a result, the temperature of the cold storage medium begins to be raised. See a section C included in FIG. 1. In the instant specification, the temperature at which the cold storage medium begins to crystallize spontaneously is referred to as "crystallization temperature".

$\Delta T$ represents difference between the melting point and the crystallization temperature of the cold storage medium. $\Delta T$ may be referred to as "supercooling degree". Due to the crystallization of the cold storage medium in the supercooling state, the cold storage medium becomes a semiclathrate hydrate (for example, see Patent Literature 1). A cage-shaped crystal is formed by hydrogen-bonding, and then, a material other than water is held in the cage-shaped crystal to form a crystal, which is referred to as a clathrate hydrate. A guest molecule joins in a hydrogen-bonding network of water molecules to form a crystal, which is referred to as a semiclathrate hydrate. A concentration at which hydrates are formed with water molecules and guest molecules without deficiency and excess is referred to as a congruent concentration. Generally, hydrates are often used near the congruent concentration.

After the release of the crystallization heat of the cold storage medium was completed with the completion of the crystallization, the temperature of the cold storage medium gradually falls so as to be equal to ambient temperature. See a section D included in FIG. 1.

The crystallization temperature is lower than the melting point of the cold storage medium. The melting point of the cold storage medium can be measured with a differential scanning calorimeter (which may be referred to as "DSC"), as well known in the technical field of the cold storage medium.

Figure 2:
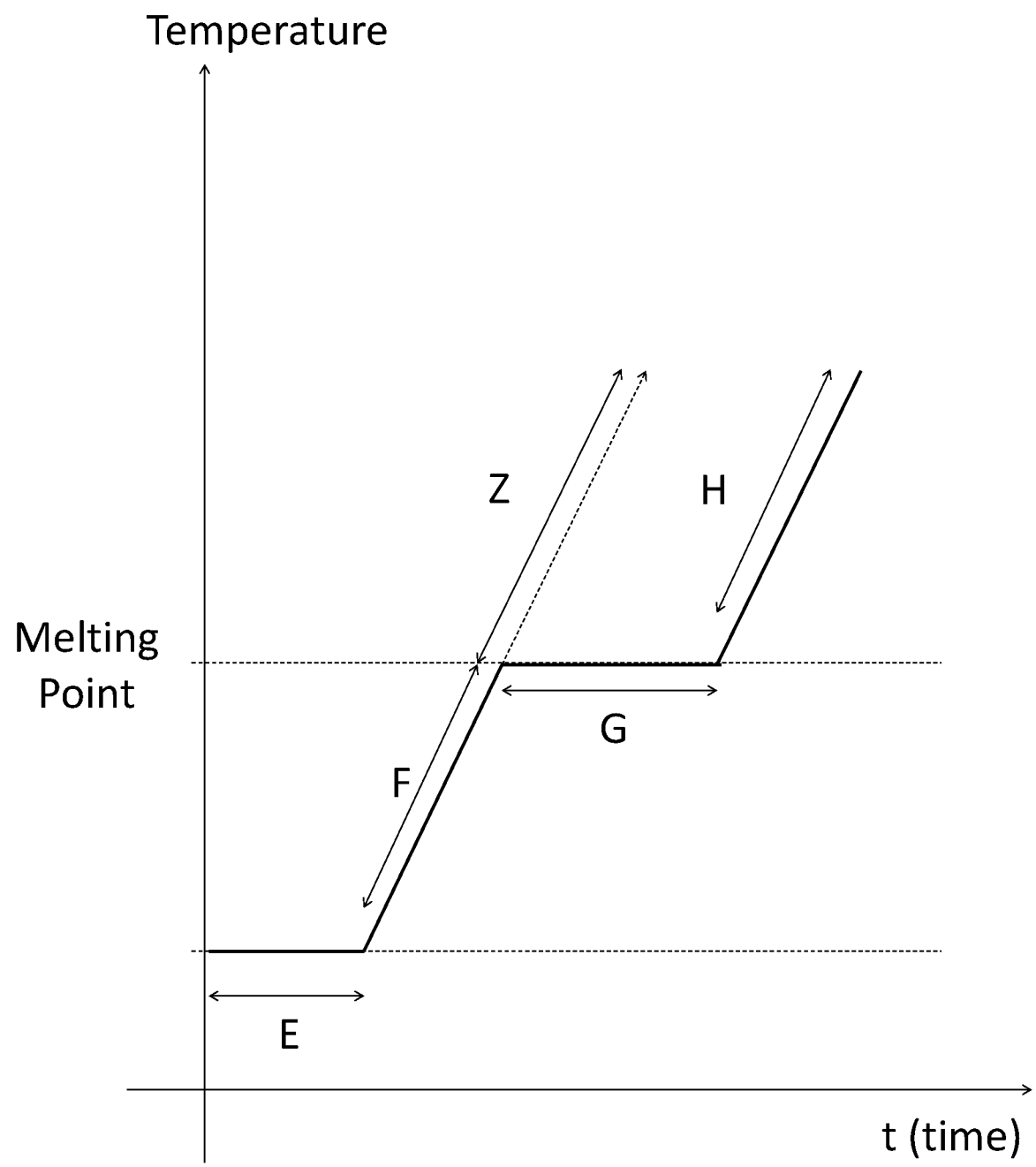
FIG. 2 is a graph showing a characteristic of the cold storage medium during a period of warming.

FIG. 2 is a graph showing a characteristic of the cold storage medium during a period of warming. In FIG. 2, a horizontal axis and a vertical axis indicate time and temperature, respectively. During a section E, the temperature of the cold storage medium is maintained at a temperature which is equal to or lower than the crystallization temperature. For example, while a door of a refrigerator is closed, the temperature in the refrigerator is maintained at a temperature which is equal to or lower than the crystallization temperature in such a manner that the temperature of the cold storage medium disposed in the refrigerator is maintained at a temperature which is equal to or lower than the crystallization temperature.

Then, the cold storage medium is gradually warmed. See a section F included in FIG. 2. For example, after the door of the refrigerator is opened (to put food into the refrigerator) at the end of the section E (namely, at the beginning of the section F), the temperature in the refrigerator is raised gradually.

After the temperature of the cold storage medium reaches the melting point of the cold storage medium, the temperature of the cold storage medium is maintained near the melting point of the cold storage medium. See a section G included in FIG. 2. In case where the cold storage medium is absent, the temperature in the refrigerator rises continuously as shown in a section Z included in FIG. 2. On the other hand, if the cold storage medium is present, the temperature in the refrigerator is maintained near the melting point of the cold storage medium during a certain period of the section G. In this way, the cold storage medium exerts its cold storage effect. At the end of the section G, the crystal of the cold storage medium melts to disappear. As a result, the cold storage medium is liquefied.

Afterwards, the temperature of the liquefied cold storage medium rises to be equal to ambient temperature. See a section H included in FIG. 2.

The cold storage medium is cooled to be reused. For example, after the door of the refrigerator is closed, as shown in the section A included in FIG. 1, the cold storage medium is cooled again to be reused.

The following two requirements (I) and (II) must be satisfied for a cold storage medium used suitably for a refrigerator.

Requirement (I): The cold storage medium has a melting point of not less than 3 degrees Celsius and not more than 10 degrees Celsius. As one example, the cold storage medium has a melting point of not less than 3 degrees Celsius and not more than 7 degrees Celsius.

Requirement (II): The cold storage medium has a small supercooling degree $\Delta T$.

The reason for the requirement (I) is that the temperature in the refrigerator should be maintained at a temperature of not less than approximately 3 degrees Celsius and not more than 10 degrees Celsius. In other words, if temperature in a cooler is maintained at a temperature of less than 0 degrees Celsius, such a cooler is not a "refrigerator" but a "freezer". On the other hand, from a viewpoint of food preservation, if temperature in a cooler is maintained at a temperature of more than 10 degrees Celsius, such a cooler would be practically meaningless as a refrigerator.

The reason for the requirement (II) will be described below. The crystallization temperature is lowered with an increase in the supercooling degree $\Delta T$. For this reason, excessive cooling is necessary to crystallize the cold storage medium in the supercooling state. As one example, crystallization temperature of ice (i.e., pure water) used as a cold storage medium is approximately minus 12 degrees Celsius. In other words, the melting point of the ice used as a cold storage medium is 0 degrees Celsius and its supercooling degree $\Delta T$ is equal to 12 degrees Kelvin. For this reason, a cooler needs an ability to cool the inside thereof to minus 12 degrees Celsius or less (e.g., to minus 18 degrees Celsius), if the ice is used as a cold storage medium. This increases an electrical power consumed by the refrigerator. Needless to say, it is desirable that power consumption is small. Therefore, the supercooling degree $\Delta T$ of the cold storage medium is required to be small.

To avoid confusing, "Kelvin" is used for the supercooling degree $\Delta T$ in the instant specification. For example, the present inventors describe "the supercooling degree $\Delta T$ is not more than n degree(s) Kelvin". Needless to say n is a real number. The description "the supercooling degree $\Delta T \leq 5$ degrees Kelvin" means that the difference between the crystallization temperature and the melting point of the cooling storage medium is not more than 5 degrees Kelvin. On the other hand, in the present specification, "Celsius" is used for temperature. For example, the present inventors describe "the crystallization temperature is 5 degrees Celsius (namely, 5° C.).".

The cold storage medium according to the present embodiment contains (i) tetra-n-butylammonium ions, (ii) silver ions, (iii) at least one kind of halide ions selected from the group consisting of fluoride ions, chloride ions, and bromide ions, (iv) water, and (v) at least one kind of carboxylic acid ions each represented by the following chemical formula (I) to satisfy the above-mentioned two requirements (I) and (II).

$$R\text{—}COO^-  \quad (I)$$

where R represents a hydrocarbon group.

(Tetra-n-Butylammonium Ion)

A tetra-n-butylammonium ion is represented by the chemical formula $((CH_3(CH_2)_3)_4N^+)$. As well known in the technical field of the cold storage medium, the tetra-n-butylammonium ion is used as a main component of the cold storage medium, namely, as a cold storage main component. It is desirable that a molar ratio between the tetra-n-butylammonium ions and the water is from 1:20 to 1:40. In other words, it is desirable that a molar ratio of the tetra-n-butylammonium ions to the water is not less than 1/40 and not more than 1/20.

As is clear from a fabrication method of the cold storage medium which will be described later, tetra-n-butylammonium ions may be derived from a tetra-n-butylammonium carboxylate, a tetra-n-butylammonium fluoride, a tetra-n-butylammonium chloride, or a tetra-n-butylammonium bromide.

(Carboxylic Acid Ion)

The carboxylic acid ion is represented by the following chemical formula (II).

$$R\text{—}COO^-  \quad (II)$$

where R is a hydrocarbon group.

Desirably, the carboxylic acid ion is a monocarboxylic acid ion.

Desirably, the carboxylic acid ion has a carbon number not less than 1 and not more than 10. More desirably, the carboxylic acid ion has a carbon number of not less than 1 and not more than 7. The carbon number of the carboxylic acid ion may be not less than 2.

R may be a linear hydrocarbon group. For example, the carboxylic acid ion is a 1-pentanoic acid ion represented by chemical formula $^-OCO(CH_2)_3CH_3$ or a 1-heptanoic acid ion represented by the chemical formula $^-OCO(CH_2)CH_3$.

Alternatively, R may be a hydrocarbon group having a branched chain. For example, the carboxylic acid ion is a 2-methylbutanoic acid ion represented by the chemical formula $^-OCOCH(CH_3)CH_2CH_3$ or a 2-ethylbutanoic acid ion represented by the chemical formula $^-$OCOCH(CH$_2$CH$_3$)CH$_2$CH$_3$. Another example of the carboxylic acid ion is a methylpentanoic acid ion, an ethylpentanoic acid ion, a propylpentanoic acid ion, a methylhexanoic acid ion, an ethylhexanoic acid ion, a propylhexanoic acid ion, or a butylhexanoic acid ion The cold storage medium according to the present embodiment may contain two or more kinds of the carboxylic acid ions. The combination of the two or more kinds of the carboxylic acid ions is not limited. An example of the combination of two kinds of the carboxylic acid ions is:

(i) 1-pentanoic acid ions and 2-ethylbutanoic acid ions, (ii) 1-heptanoic acid ions and 2-ethylbutanoic acid ions, or (iii) 2-methylbutanoic acid ions and 2-ethylbutanoic acid ions.

Alternatively, the cold storage medium according to the present embodiment may contain one kind of the carboxylic acid ion. It is desirable that a molar ratio between the carboxylic acid ions and the water is from 1:20 to 1:40. In other words, it is desirable that the molar ratio of the carboxylic acid ions to the water is not less than 1/40 and not more than 1/20.

As is clear from a fabrication method of the cold storage medium which will be described later, the carboxylic acid ions may be derived from tetra-n-butylammonium carboxylate or silver carboxylate.

(Silver Ion and Halide Ion)

The cold storage medium according to the present embodiment contains silver ions and at least one kind of halide ions selected from the group consisting of fluoride ions, chloride ions, and bromide ions. As is clear from the fabrication method of the cold storage medium which will be described later, the silver ions may be derived from the silver carboxylate. Similarly, the halide ions may be derived from the tetra-n-butylammonium halide.

The term "halide ions" used in the present specification includes fluoride ions, chloride ions, and bromide ions. However, the term "halide ions" used in the present specification does not include iodide ions. Similarly, the term "halide" used in the present specification includes fluoride, chloride, and bromide. However, the "halide" used in the present specification does not include iodide.

On the condition that the cold storage medium according to the present embodiment contains the tetrabutylammonium ions, the cold storage medium according to the present embodiment is characterized by containing three components of the silver ions, the at least one kind of halide ions selected from the group consisting of fluoride ions, chloride ions, and bromide ions, and the carboxylic acid ions.

As is demonstrated in the inventive examples which will be described later, the cold storage medium according to the present embodiment has a melting point of not less than 3 degrees Celsius and not more than 10 degrees Celsius (desirably, not less than 4 degrees Celsius and not more than 7 degrees Celsius) and a small supercooling degree $\Delta T$ of not more than 5 degrees Kelvin (desirably, not more than 2 degrees Kelvin), since the cold storage medium according to the present embodiment contains the tetrabutylammonium ions as the cold storage main component and further contains three components of the silver ions, the at least one kind of halide ions selected from the group consisting of fluoride ions, chloride ions, and bromide ions, and the carboxylic acid ions. For this reason, the cold storage medium according to the present embodiment can be used suitably for a refrigerator.

In case where the cold storage medium does not contain silver ions, the cold storage medium fails to crystallize, as is clear from the comparative examples F1-F11, the comparative examples CI1-CI11, and the comparative examples Br1-Br3. For this reason, the cold storage effect is not exerted.

In case where the cold storage medium does not contain the at least one kind of halide ions selected from the group consisting of fluoride ions, chloride ions, and bromide ions, the cold storage medium fails to crystallize, as is clear from the comparative example I. For this reason, the cold storage effect is not exerted.

In case where the cold storage medium does not contain the carboxylic acid ions, the cold storage medium fails to crystallize, as is clear from the comparative examples X1 and X2. For this reason, the cold storage effect is not exerted.

The cold storage medium according to the present embodiment contains tetrabutylammonium ions as the cold storage main component.

As one example, a molar ratio between the silver ions and the halide ions is from 1:5 to 1:20. In other words, a molar ratio of the halide ions to the silver ions is not less than 5 and not more than 20. Desirably, the molar ratio is not less than 7.5 and not more than 15.

(Mechanism of Crystallization)

The present inventors do not like to be bound to a theory; however, the mechanism of the present invention which the present inventors believe will be described below.

The silver ions contained in the cold storage medium according to the present embodiment forms a metallic silver core due to Brownian movement or intermolecular interaction. Then, the metallic silver core is integrated with the silver carboxylate. In this way, a silver nanoparticle which serves as a microcation is formed.

A halide ion contained in the cold storage medium is adsorbed on the silver ion included in the silver carboxylate disposed on the surface of the microcation. Furthermore, a tetra-n-butylammonium ion is adsorbed on the halide ion.

The halide ions are drawn to the surface of the silver nanoparticle which serves as the microcation. Tetra-n-butylammonium ions which serve as counter cations of the halide ions are drawn electrically to the halide ions. A plurality of the halide ions and the tetra-n-butylammonium ions which have been dispersed in the cold storage medium come close to each other. As a result, increased is the probability that molecules of these ions are disposed suitably for formation of hydrate composed of the tetra-n-butylammonium ions and the halide ions. The melting point of the hydrate composed of the tetra-n-butylammonium ions and the halide ions is approximately 15 degrees Celsius. See Non-Patent Literature 1. For this reason, when the cold storage medium is disposed in a refrigerator having an inside temperature of not more than 10 degrees Celsius, the cold storage medium crystallizes in a rapid manner, since the cold storage medium has a supercooling degree $\Delta T$ of not less than 5 Kelvin. Furthermore, the hydrate composed of the tetra-n-butylammonium ions and the halide ions (hereinafter, the hydrate is referred to as "TX hydrate") has a crystallization structure similar to that of a hydrate composed of tetra-n-butylammonium ions and 2-ethylbutanoic acid ions (hereinafter, the hydrate is referred to as "TE hydrate"). For this reason, when the TX hydrate is formed, the crystallization of the TE hydrate proceeds in a rapid manner using the TX hydrate as a seed crystal.

EXAMPLES

Hereinafter, the present invention will be described in more detail with reference to the following examples.

Inventive Example F1

(Synthesis of TBA-2-EBA)

Tetra-n-butylammonium-2-ethylbutylate (hereinafter, referred to as "TBA-2-EBA") represented by the following chemical formula (F-I) was synthesized as below.

[Chem. 1]

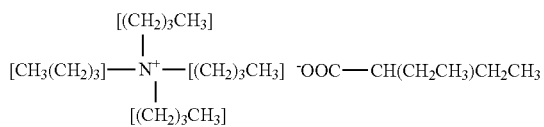

(F-I)

First, 2-ethylbutanoic acid (chemical formula: HOOC—CH(CH$_2$CH$_3$)CH$_2$CH$_3$, 0.1 mol, purchased from Tokyo Chemical Industry Co. Ltd.) was added to a tetra-n-butylammonium hydroxide aqueous solution (0.1 mol, purchased from Tokyo Chemical Industry Co. Ltd., 40% aqueous solution, hereinafter referred to as "TBA-OH") represented by the following chemical formula (F-II). In this way, an aqueous solution was provided.

[Chem. 2]

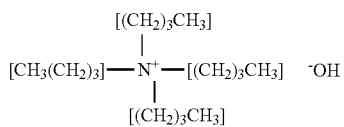

(F-II)

The provided aqueous solution was dried with an evaporator under a reduced pressure at a temperature of 40 degrees Celsius. In this way, the provided aqueous solution was dehydrated to provide TBA-2-EBA. In this way, TBA-2-EBA (0.1 mol) was provided.

Then, the provided TBA-2-EBA (0.1 mol) was dissolved in pure water (3.85 mol) to provide a TBA-2-EBA aqueous solution (34% by weight).

(Synthesis of Silver Pentanoate)

Silver pentanoate represented by the following chemical formula (F-III) was synthesized as below.

[Chem. 3]

Ag$^+$ $^-$OOC—(CH$_2$)$_3$CH$_3$ (F-III)

In a darkroom, silver nitrate (0.11 mol, purchased from Wako Pure Chemical Industries, Ltd.) and pentanoic acid (0.10 mol, purchased from Tokyo Chemical Industry Co. Ltd.) were added to water to provide an aqueous solution in which the silver nitrate and the pentanoic acid were mixed with each other. Then, while the aqueous solution was stirred, the aqueous solution was neutralized with a sodium hydroxide aqueous solution (0.09 mol) having a concentration of 1 mol/liter to provide silver pentanoate represented by the chemical formula (F-III) as a precipitation. The provided precipitation (i.e., the silver pentanoate) was filtered with a filter. The residue was washed with distilled water and subsequently was dried. In this way, the silver pentanoate (0.10 mol) was provided.

(Purchase of TBA-F)

Tetra-n-butylammonium fluoride aqueous solution (0.287 mol, 75% aqueous solution, hereinafter, referred to as "TBA-F") represented by the following chemical formula (F-IV) was purchased from Sigma Aldrich.

[Chem. 4]

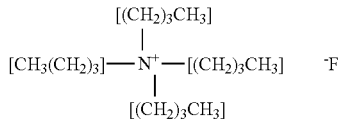

(F-IV)

(Preparation of Cold Storage Medium)

The cold storage medium according to the inventive example F1 was prepared as below. First, the silver pentanoate (2.0 micromol) was dissolved in the TBA-F aqueous solution (20 micromol) to provide a mixture. Note that silver carboxylate such as silver pentanoate is insoluble in both a hydrophilic solvent (e.g., water) and a hydrophobic solvent (e.g., oil); however, the silver carboxylate is soluble in a quaternary ammonium salt aqueous solution.

Then, the mixture was added to the TBA-2-EBA aqueous solution (TBA-2-EBA: 476 micromol). Just after the addition, the aqueous solution got cloudy; however, after several hours, the aqueous solution became transparent. Precipitation was slightly observed in the aqueous solution. The aqueous solution was left at a room temperature over 24 hours. In this way, the cold storage medium according to the inventive example F1 was prepared. As is clear from above, the cold storage medium according to the inventive example F1 has a composition shown in the following Table 1.

TABLE 1

| Name of Material | Amount |
|---|---|
| TBA quaternary ammonium ions | 496 micromol |
| TBA-2-EBA ions | 476 micromol |
| Pentanoic acid ions | 2 micromol |
| Silver ions | 2 micromol |
| Fluoride ions | 20 micromol |
| Water (derived from TBA-2-EBA aqueous solution) | Approximately 18,300 micromol |

(Measurement of Melting Point and Latent Heat Amount)

The melting point and the latent heat amount of the cold storage medium according to the inventive example F1 were measured as below with a differential scanning calorimeter. First, the cold storage medium according to the inventive example F1 (10 milligrams) was put into a container formed of aluminum. Then, the container was sealed with a lid.

The container was set in a differential scanning calorimeter (purchased from PerkinElmer, trade name: DSC-8500). The cold storage medium put in the container was cooled from a room temperature to minus 20 degrees Celsius at a rate of 2 degrees Celsius/minute. Then, the cold storage medium was left at rest at a temperature of minus 20 degrees Celsius for five minutes. In this way, the present inventors believed that the cold storage medium crystallized to be a semiclathrate hydrate. Finally, the cold storage medium was warmed from minus 20 degrees Celsius to a room temperature at a rate of 2 degrees Celsius/minute. In this way, the crystallized cold storage medium was melted.

On the basis of an endothermic peak output from the differential scanning calorimeter in a period during which the cold storage medium (namely, the semiclathrate hydrate cold storage medium) was melted, the melting point of the cold storage medium according to the inventive example F1 was identified and the latent heat amount of the cold storage medium according to the inventive example F1 was calculated. As a result, the melting point of the cold storage medium according to the inventive example F1 was 6 degrees Celsius. The latent heat amount of the melting point of the cold storage medium according to the inventive example F1 was 178 joules/gram.

(Measurement of Supercooling Degree ΔT)

The supercooling degree ΔT of the cold storage medium according to the inventive example F1 was measured as below. First, the cold storage medium according to the inventive example F1 (0.5 grams) was put into a glass bottle having a volume of 9 milliliters. Then, the glass bottle was sealed with a lid.

The glass bottle was put into a thermostat bath (purchased from ESPEC Corp., trade name: SU-241). The temperature in the thermostat bath was 20 degrees Celsius.

After the temperature in the thermostat bath was lowered to 5 degrees Celsius at a rate of minus 1 degree Celsius/minute, the temperature in the thermostat bath was maintained at 5 degrees Celsius.

When six minutes elapsed from the beginning of the maintenance of the temperature in the thermostat bath at 5 degrees Celsius, the cold storage medium according to the inventive example F1 crystallized spontaneously. With the crystallization, the cold storage medium according to the inventive example F1 released crystallization heat. Due to the release of the crystallization heat, the temperature of the cold storage medium according to the inventive example F1 was raised. Finally, the present inventors visually confirmed the completion of the crystallization of the cold storage medium according to the inventive example F1. The period between the beginning and the completion of the crystallization was 36 minutes.

As described above, since the cold storage medium according to the inventive example F1 crystallized spontaneously at a temperature of 5 degrees Celsius, the cold storage medium according to the inventive example F1 had a supercooling degree ΔT of 1 Kelvin (=(the melting point of 6 degrees Celsius)–(the crystallization point of 5 degrees Celsius).

Inventive Example F2

In the inventive example F2, an experiment similar to the inventive example F1 was performed except that silver heptanoate represented by the following chemical formula (F-V) was used in place of the silver pentanoate.

[Chem. 5]

$Ag^+{}^-OOC—(CH_2)_5CH_3$  (F-V)

(Synthesis of Silver Heptanoate)

The silver heptanoate was synthesized as below. In the darkroom, silver nitrate (0.11 mol, purchased from Wako Pure Chemical Industries, Ltd.) and heptanoic acid (0.10 mol, purchased from Tokyo Chemical Industry Co. Ltd.) were added to water to provide an aqueous solution in which the silver nitrate and the heptanoic acid were mixed. Then, while the aqueous solution was stirred, the aqueous solution was neutralized with a sodium hydroxide aqueous solution (0.09 mol) having a concentration of 1 mol/liter to provide silver heptanoate represented by the chemical formula (F-V) as a precipitation. The provided precipitation (i.e., the silver heptanoate) was filtered with a filter. The residue was washed with distilled water and subsequently was dried. In this way, the silver heptanoate (0.10 mol) was provided.

Inventive Example F3

In the inventive example F3, an experiment similar to the inventive example F1 was performed except that silver 2-methylbutanoate represented by the following chemical formula (F-VI) (hereinafter, referred to as "2-MBA silver salt") was used in place of the silver pentanoate.

[Chem. 6]

$Ag^+{}^-OOC—CH(CH_3)CH_2CH_3$  (F-VI)

(Synthesis of 2-MBA Silver Salt)

The 2-MBA silver salt was synthesized as below. In the darkroom, silver nitrate (0.11 mol, purchased from Wako Pure Chemical Industries, Ltd.) and 2-methylbutanoic acid (0.1 mol, purchased from Tokyo Chemical Industry Co. Ltd.) were added to water to provide an aqueous solution in which the silver nitrate and the 2-methylbutanoic acid were mixed. Then, while the aqueous solution was stirred, the aqueous solution was neutralized with a sodium hydroxide aqueous solution (0.09 mol) having a concentration of 1 mol/liter to provide a 2-MBA silver salt represented by the chemical formula (F-VI) as a precipitation. The provided precipitation (i.e., the 2-MBA silver salt) was filtered with a filter. The residue was washed with distilled water and subsequently was dried. In this way, the 2-MBA silver salt (0.10 mol) was provided.

Inventive Example F4

In the inventive example F4, an experiment similar to the inventive example F1 was performed except that silver 2-ethylbutanoate represented by the following chemical formula (F-VII) (hereinafter, referred to as "2-EBA silver salt") was used in place of the silver pentanoate.

[Chem. 7]

$Ag^+{}^-OOC—CH(CH_2CH_3)CH_2CH_3$  (F-VII)

(Synthesis of 2-EBA Silver Salt)

The 2-EBA silver salt was synthesized as below. In the darkroom, silver nitrate (0.11 mol, purchased from Wako Pure Chemical Industries, Ltd.) and 2-ethylbutanoic acid (0.10 mol, purchased from Tokyo Chemical Industry Co. Ltd.) were added to water to provide an aqueous solution in which the silver nitrate and the 2-ethylbutanoic acid were mixed. Then, while the aqueous solution was stirred, the aqueous solution was neutralized with a sodium hydroxide aqueous solution (0.09 mol) having a concentration of 1 mol/liter to provide a 2-EBA silver salt represented by the chemical formula (F-VII) as a precipitation. The provided precipitation (i.e., the 2-EBA silver salt) was filtered with a filter. The residue was washed with distilled water and subsequently was dried. In this way, the 2-EBA silver salt (0.10 mol) was provided.

Note that each of the cold storage media according to the inventive examples F1-F3 contain two kinds of organic anions, whereas the cold storage media according to the inventive example F4 contains one kind of organic anion (namely, 2-methylbutanoic acid anion).

The following Tables 2-3 show the results of the inventive example F1-F4.

TABLE 2

| | Composition | Ag:F Molar ratio | Latent heat amount (J/gram) | Melting point (° C.) |
|---|---|---|---|---|
| Inventive example F1 | TBA-2-EBA: 476 micromol, Silver pentanoate: 2 micromol, TBA-F 20: micromol, and Water: approximately 18,300 micromol | 1:10 | 178 | 6 |
| Inventive example F2 | TBA-2-EBA: 476 micromol, Silver heptanoate: 2 micromol, TBA-F: 20 micromol, and Water: approximately 18,300 micromol | 1:10 | 175 | 6 |
| Inventive example F3 | TBA-2-EBA: 476 micromol, 2-MBA silver salt: 2 micromol, TBA-F: 20 micromol, and Water: approximately 18,300 micromol | 1:10 | 180 | 6 |
| Inventive example F4 | TBA-2-EBA: 476 micromol, 2-EBA silver salt: 2 micromol, TBA-F: 20 micromol, and Water: approximately 18,300 micromol | 1:10 | 181 | 6 |

TABLE 3

| | ΔT (Kelvin) | Crystallization Start time (minute) | Crystallization Completion time (minute) | Period between the crystallization start time and the crystallization completion time (minute) |
|---|---|---|---|---|
| Inventive example F1 | 1 | 6 | 36 | 30 |
| Inventive example F2 | 1 | 4 | 31 | 27 |
| Inventive example F3 | 1 | 8 | 31 | 23 |
| Inventive example F4 | 1 | 7 | 31 | 24 |

Inventive Examples F5-F8

In the inventive examples F5-F8, experiments similar to the inventive examples F1-F4 were performed respectively, except that the amount of the TBA-F aqueous solution was not 20 micromol but 40 micromol.

The following Tables 4-5 show the results of the inventive examples F5-F8.

TABLE 4

| | Composition | Ag:F Molar ratio | Latent heat amount (J/gram) | Melting point (° C.) |
|---|---|---|---|---|
| Inventive example F5 | TBA-2-EBA: 476 micromol, Silver pentanoate: 2 micromol, TBA-F: 40 micromol, and Water: approximately 18,300 micromol | 1:20 | 174 | 7 |
| Inventive example F6 | TBA-2-EBA: 476 micromol, Silver heptanoate: 2 micromol, TBA-F: 40 micromol, and Water: approximately 18,300 micromol | 1:20 | 171 | 7 |
| Inventive example F7 | TBA-2-EBA: 476 micromol, MBA silver salt: 2 micromol, TBA-F: 40 micromol, and Water: approximately 18,300 micromol | 1:20 | 178 | 7 |
| Inventive example F8 | TBA-2-EBA: 476 micromol, 2-EBA silver salt: 2 micromol, TBA-F: 40 micromol, and Water: approximately 18,300 micromol | 1:20 | 170 | 7 |

TABLE 5

| | ΔT (Kelvin) | Crystallization Start time (minute) | Crystallization Completion time (minute) | Period between the crystallization start time and the crystallization completion time (minute) |
|---|---|---|---|---|
| Inventive example F5 | 2 | 6 | 32 | 26 |
| Inventive example F6 | 2 | 10 | 38 | 28 |
| Inventive example F7 | 2 | 5 | 31 | 26 |
| Inventive example F8 | 2 | 3 | 30 | 27 |

Inventive Examples F9-F12

In the inventive examples F9-F12, experiments similar to the inventive examples F1-F4 were performed respectively, except that the amount of the organic silver salt (namely, the silver pentanoate, the silver heptanoate, the 2-MBA silver salt, or the 2-EBA silver salt) was not 2 micromol but 1 micromol, and that the amount of the TBA-F was not 20 micromol but 10 micromol.

The following Tables 6-7 show the results of the inventive examples F9-F12.

TABLE 6

| | Composition | Ag:F Molar ratio | Latent heat amount (J/gram) | Melting point (° C.) |
|---|---|---|---|---|
| Inventive example F9 | TBA-2-EBA: 476 micromol, Silver pentanoate: 1 micromol, TBA-F: 10 micromol, and Water: approximately 18,300 micromol | 1:10 | 180 | 6 |
| Inventive example F10 | TBA-2-EBA: 476 micromol, Silver heptanoate: 1 micromol, TBA-F: 10 micromol, and Water: approximately 18,300 micromol | 1:10 | 171 | 6 |
| Inventive example F11 | TBA-2-EBA: 476 micromol, 2-MBA silver salt: 1 micromol, TBA-F: 10 micromol, and Water: approximately 18,300 micromol | 1:10 | 170 | 6 |
| Inventive example F12 | TBA-2-EBA: 476 micromol, 2-EBA silver salt: 1 micromol, TBA-F: 10 micromol, and Water: approximately 18,300 micromol | 1:10 | 175 | 6 |

TABLE 7

| | ΔT (Kelvin) | Crystallization Start time (minute) | Crystallization Completion time (minute) | Period between the crystallization start time and the crystallization completion time (minute) |
|---|---|---|---|---|
| Inventive example F9 | 1 | 18 | 100 | 82 |
| Inventive example F10 | 1 | 30 | 120 | 90 |
| Inventive example F11 | 1 | 16 | 110 | 94 |
| Inventive example F12 | 1 | 105 | Immeasurable | — |

Inventive Example F13

(Preparation of TBA-2-EBA Aqueous Solution)

The TBA-2-EBA provided in the inventive example F1 (0.1 mol) was dissolved in pure water (3.85 mol). In this way, a TBA-2-EBA aqueous solution (34% by weight) was provided.

(Preparation of Cold Storage Medium)

The cold storage medium according to the inventive example F13 was prepared as below. First, the silver pentanoate (1.2 micromol) was dissolved in the TBA-F aqueous solution (24 micromol) to provide a mixture. Then, the mixture was added to the TBA-2-EBA aqueous solution (1,400 micromol). The aqueous solution was left at a room temperature over 24 hours. In this way, the cold storage medium according to the inventive example F13 was prepared.

(Measurement of Melting Point and Latent Heat Amount)

The melting point and the latent heat amount of the cold storage medium according to the inventive example F13 were measured as below with the differential scanning calorimeter. First, the cold storage medium according to the inventive example F13 (10 milligrams) was put into a container formed of aluminum. Then, the container was sealed with a lid.

The container was set in the differential scanning calorimeter similarly to the case of the inventive example F1. The cold storage medium put in the container was cooled from a room temperature to minus 20 degrees Celsius at a rate of 2 degrees Celsius/minute. Then, the cold storage medium was left at rest at a temperature of minus 20 degrees Celsius for five minutes. In this way, the present inventors believed that the cold storage medium crystallized to be a semiclathrate hydrate. Finally, the cold storage medium was warmed from minus 20 degrees Celsius to a room temperature at a rate of 2 degrees Celsius/minute. In this way, the crystallized cold storage medium was melted. The crystallization beginning time and the crystallization completion time were 1 minute and 23 minutes, respectively. According to the differential scanning calorimeter, the melting point and the heat latent amount of the cold storage medium according to the inventive example F13 were 6 degrees Celsius and 175 joules/gram, respectively. Therefore, the cold storage medium according to the inventive example F13 had a supercooling degree ΔT of 1 degree Kelvin.

Inventive Example F14

In the inventive example F14, an experiment similar to the inventive example F13 was performed, except that the amounts of the silver pentanoate and the TBA-F aqueous solution were 2.4 micromol and 12 micromol, respectively.

Inventive Example F15

In the inventive example F15, an experiment similar to the inventive example F13 was performed, except that the amount of the silver pentanoate was 2.4 micromol.

Inventive Example F16

In the inventive example F16, an experiment similar to the inventive example F13 was performed, except that silver acetate (2.4 micromol) represented by the following chemical formula (F-VIII) was used in place of the silver pentanoate (1.2 micromol) and that the amount of the TBA-F aqueous solution was 12 micromol.

[Chem. 8]

(F-VIII)

(Synthesis of Silver Acetate)

The silver acetate was synthesized as below. In the darkroom, silver nitrate (0.11 mol, purchased from Wako Pure Chemical Industries, Ltd.) and acetic acid (0.10 mol, purchased from Tokyo Chemical Industry Co. Ltd.) were added to water to provide an aqueous solution in which the silver nitrate and the acetic acid were mixed. Then, while the aqueous solution was stirred, the aqueous solution was neutralized with a sodium hydroxide aqueous solution (0.09 mol) having a concentration of 1 mol/liter to provide silver acetate represented by the chemical formula (F-VIII) as a precipitation. The provided precipitation (i.e., the silver acetate) was filtered with a filter. The residue was washed with distilled water and subsequently was dried. In this way, the silver acetate (0.10 mol) was provided.

Inventive Example F17

In the inventive example F17, an experiment similar to the inventive example F13 was performed, except that the silver acetate (2.4 micromol) represented by the chemical formula (F-VIII) was used in place of the silver pentanoate (1.2 micromol).

Inventive Example F18

In the inventive example F18, an experiment similar to the inventive example F13 was performed, except that silver propanoate (2.4 micromol) represented by the following chemical formula (F-IX) was used in place of the silver pentanoate (1.2 micromol) and that the amount of the TBA-F aqueous solution was 12 micromol.

[Chem. 9]

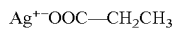  (F-IX)

(Synthesis of Silver Propanoate)

The silver propanoate was synthesized as below. In the darkroom, silver nitrate (0.11 mol, purchased from Wako Pure Chemical Industries, Ltd.) and propanoic acid (0.10 mol, purchased from Tokyo Chemical Industry Co. Ltd.) were added to water to provide an aqueous solution in which the silver nitrate and the propanoic acid were mixed. Then, while the aqueous solution was stirred, the aqueous solution was neutralized with a sodium hydroxide aqueous solution (0.09 mol) having a concentration of 1 mol/liter to provide silver propanoate represented by the chemical formula (F-IX) as a precipitation. The provided precipitation (i.e., the silver propanoate) was filtered with a filter. The residue was washed with distilled water and subsequently was dried. In this way, the silver propanoate (0.10 mol) was provided.

Inventive Example F19

In the inventive example F19, an experiment similar to the inventive example F13 was performed, except that the silver propanoate (2.4 micromol) represented by the chemical formula (F-IX) was used in place of the silver pentanoate (1.2 micromol).

The following Tables 8-9 show the results of the inventive examples F13-F19.

TABLE 8

|  | Composition | Ag:F Molar ratio | Latent heat amount (J/gram) | Melting point (° C.) |
|---|---|---|---|---|
| Inventive example F13 | TBA-2-EBA: 1,400 micromol, Silver pentanoate: 1.2 micromol, TBA-F: 24 micromol, and Water: approximately 18,300 micromol | 1:20 | 175 | 6 |
| Inventive example F14 | TBA-2-EBA: 1,400 micromol, Silver pentanoate: 2.4 micromol, TBA-F 12 micromol, and Water approximately 18,300 micromol | 1:5 | 175 | 6 |
| Inventive example F15 | TBA-2-EBA: 1,400 micromol, Silver pentanoate: 2.4 micromol, TBA-F: 24 micromol, and Water: approximately 18,300 micromol | 1:10 | 180 | 6 |
| Inventive example F16 | TBA-2-EBA: 1,400 micromol, Silver acetate: 2.4 micromol, TBA-F: 12 micromol, and Water: approximately 18,300 micromol | 1:5 | 165 | 6 |
| Inventive example F17 | TBA-2-EBA: 1,400 micromol, Silver acetate: 2.4 micromol, TBA-F: 24 micromol, and Water: approximately 18,300 micromol | 1:10 | 180 | 6 |
| Inventive example F18 | TBA-2-EBA: 1,400 micromol, Silver propanoate: 2.4 micromol, TBA-F: 12 micromol, and Water: approximately 18,300 micromol | 1:5 | 175 | 6 |
| Inventive example F19 | TBA-2-EBA: 1,400 micromol, Silver propanoate: 2.4 micromol, TBA-F: 24 micromol, and Water approximately 18,300 micromol | 1:10 | 173 | 6 |

TABLE 9

| | ΔT (Kelvin) | Crystallization Start time (minute) | Crystallization Completion time (minute) | Period between the crystallization start time and the crystallization completion time (minute) |
|---|---|---|---|---|
| Inventive example F13 | 1 | 1 | 23 | 22 |
| Inventive example F14 | 1 | 7 | 48 | 41 |
| Inventive example F15 | 1 | 4 | 26 | 22 |
| Inventive example F16 | 1 | 11 | 93 | 82 |
| Inventive example F17 | 1 | 2 | 32 | 30 |
| Inventive example F18 | 1 | 11 | 93 | 82 |
| Inventive example F19 | 1 | 11 | 36 | 25 |

Comparative Example F1

In the comparative example F1, an experiment similar to the inventive example F1 was performed, except that neither the silver pentanoate nor the TBA-F was used. In other words, the cold storage medium according to the comparative example F1 contained TBA-2-EBA only.

Comparative Example F2

In the comparative example F2, an experiment similar to the inventive example F1 was performed, except for the following two matters (I) and (II).

(I) Diacetoxyzirconium(IV) oxide (1.0 micromol, purchased from Tokyo Chemical Industry Co. Ltd.) represented by the chemical formula $ZrO(C_2H_3O_2)_2$ was used in place of the silver pentanoate (2.0 micromol).

(II) The amount of TBA-F was not 20 micromol but 10 micromol.

Comparative Example F3

In the comparative example F3, an experiment similar to the inventive example F1 was performed, except for the following two matters (I) and (II).

(I) Gold triacetate (1.0 micromol, purchased from Alfa Aesar) was used in place of the silver pentanoate (2.0 micromol).

(II) The amount of TBA-F was not 20 micromol but 10 micromol.

Comparative Example F4

In the comparative example F4, an experiment similar to the inventive example F1 was performed, except for the following two matters (I) and (II).

(I) Palladium(II) acetate (1.0 micromol, purchased from Tokyo Chemical Industry Co. Ltd.) was used in place of the silver pentanoate (2.0 micromol).

(II) The amount of TBA-F was not 20 micromol but 10 micromol.

Comparative Example F5

In the comparative example F5, an experiment similar to the inventive example F1 was performed, except for the following two matters (I) and (II).

(I) Iridium acetate (1.0 micromol, purchased from Wako Pure Chemical Industries, Ltd.) was used in place of the silver pentanoate (2.0 micromol).

(II) The amount of TBA-F was not 20 micromol but 10 micromol.

Comparative Example F6

In the comparative example F6, an experiment similar to the inventive example F1 was performed, except for the following two matters (I) and (II).

(I) Zinc acetate (1.0 micromol, purchased from Wako Pure Chemical Industries, Ltd.) was used in place of the silver pentanoate (2.0 micromol).

(II) The amount of TBA-F was not 20 micromol but 10 micromol.

Comparative Example F7

In the comparative example F7, an experiment similar to the inventive example F1 was performed, except for the following two matters (I) and (II).

(I) Nickel acetate (1.0 micromol, purchased from Wako Pure Chemical Industries, Ltd.) was used in place of the silver pentanoate (2.0 micromol).

(II) The amount of TBA-F was not 20 micromol but 10 micromol.

Comparative Example F8

In the comparative example F8, an experiment similar to the inventive example F1 was performed, except for the following two matters (I) and (II).

(I) Manganese acetate (1.0 micromol, purchased from Wako Pure Chemical Industries, Ltd.) was used in place of the silver pentanoate (2.0 micromol).

(II) The amount of TBA-F was not 20 micromol but 10 micromol.

Comparative Example F9

In the comparative example F9, an experiment similar to the inventive example F1 was performed, except for the following two matters (I) and (II).

(I) Cobalt acetate (1.0 micromol, purchased from Wako Pure Chemical Industries, Ltd.) was used in place of the silver pentanoate (2.0 micromol).

(II) The amount of TBA-F was not 20 micromol but 10 micromol.

Comparative Example F10

In the comparative example F10, an experiment similar to the inventive example F1 was performed, except for the following two matters (I) and (II).

(I) Cupper(I) acetate (1.0 micromol, purchased from Wako Pure Chemical Industries, Ltd.) was used in place of the silver pentanoate (2.0 micromol).

(II) The amount of TBA-F was not 20 micromol but 10 micromol.

Comparative Example F11

In the comparative example F11, an experiment similar to the inventive example F1 was performed, except for the following two matters (I) and (II).

(I) Cupper(II) acetate (1.0 micromol, purchased from Wako Pure Chemical Industries, Ltd.) was used in place of the silver pentanoate (2.0 micromol).

(II) The amount of TBA-F was not 20 micromol but 10 micromol.

The following Tables 10-11 shows the results of the comparative examples F1-F11. The cold storage media according to the comparative examples F1-F11 did not crystallize. Therefore, the supercooling degrees ΔT thereof were not calculated.

TABLE 10

|  | Composition | Ag:F Molar ratio | Latent heat amount (J/gram) | Melting point (° C.) |
| --- | --- | --- | --- | --- |
| Comparative example F1 | TBA-2-EBA: 476 micromol | — | 173 | 6 |
| Comparative example F2 | TBA-2-EBA: 476 micromol, Diacetoxyzirconium(IV) oxide: 1 micromol, TBA-F: 10 micromol, and Water: approximately 18,300 micromol | 1:10 | 176 | 6 |
| Comparative example F3 | TBA-2-EBA: 476 micromol, Gold triacetate: 1 micromol, TBA-F: 10 micromol, and Water: approximately 18,300 micromol | 1:10 | 170 | 6 |
| Comparative example F4 | TBA-2-EBA: 476 micromol, Palladium(II) acetate: 1 micromol, TBA-F: 10 micromol, and Water: approximately 18,300 micromol | 1:10 | 174 | 6 |
| Comparative example F5 | TBA-2-EBA: 476 micromol, Iridium acetate: 1 micromol, TBA-F: 10 micromol, and Water: approximately 18,300 micromol | 1:10 | 177 | 6 |
| Comparative example F6 | TBA-2-EBA: 476 micromol, Zinc acetate: 1 micromol, TBA-F: 10 micromol, and Water: approximately 18,300 micromol | 1:10 | 178 | 6 |
| Comparative example F7 | TBA-2-EBA: 476 micromol, Nickel acetate: 1 micromol, TBA-F: 10 micromol, and Water: approximately 18,300 micromol | 1:10 | 174 | 6 |
| Comparative example F8 | TBA-2-EBA: 476 micromol, Manganese acetate: 1 micromol, TBA-F: 10 micromol, and Water: approximately 18,300 micromol | 1:10 | 173 | 6 |
| Comparative example F9 | TBA-2-EBA: 476 micromol, Cobalt acetate: 1 micromol, TBA-F: 10 micromol, and Water: approximately 18,300 micromol | 1:10 | 175 | 6 |
| Comparative example F10 | TBA-2-EBA: 476 micromol, Copper acetate (I): 1 micromol, TBA-F: 10 micromol, and Water: approximately 18,300 micromol | 1:10 | 172 | 6 |
| Comparative example F11 | TBA-2-EBA: 476 micromol, Copper acetate (II): 1 micromol, TBA-F: 10 micromol, and Water: approximately 18,300 micromol | 1:10 | 170 | 6 |

TABLE 11

|  | ΔT (Kelvin) | Crystallization Start time (minute) | Crystallization Completion time (minute) | Period between the crystallization start time and the crystallization completion time (minute) |
| --- | --- | --- | --- | --- |
| Comparative example F1 | — | Not crystallized | — | — |
| Comparative example F2 | — | Not crystallized | — | — |
| Comparative example F3 | — | Not crystallized | — | — |

TABLE 11-continued

|  | ΔT (Kelvin) | Crystallization Start time (minute) | Crystallization Completion time (minute) | Period between the crystallization start time and the crystallization completion time (minute) |
|---|---|---|---|---|
| Comparative example F4 | — | Not crystallized | — | — |
| Comparative example F5 | — | Not crystallized | — | — |
| Comparative example F6 | — | Not crystallized | — | — |
| Comparative example F7 | — | Not crystallized | — | — |
| Comparative example F8 | — | Not crystallized | — | — |
| Comparative example F9 | — | Not crystallized | — | — |
| Comparative example F10 | — | Not crystallized | — | — |
| Comparative example F11 | — | Not crystallized | — | — |

Inventive Example F20

In the inventive example F20, an experiment similar to the inventive example F1 was performed, except for the following matters (I)-(IV).

(I) Tetra-n-butylammonium-3-methylpentanoate (hereinafter, referred to as "TBA-3-MPA") represented by the following chemical formula (F-X) was used in place of TBA-2-EBA.

[Chem. 10]

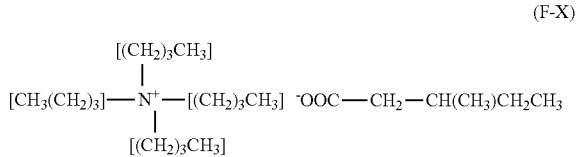

(F-X)

(II) The amount of the silver pentanoate was 1 micromol.

(III) The amount of TBA-F was not 20 micromol but 10 micromol.

(IV) The temperature in the thermostat bath was maintained at 4 degrees Celsius.

(Synthesis of TBA-3-MPA)

TBA-3-MPA was synthesized as below.

First, 3-methyl-pentanoic acid (chemical formula: HOOC—$CH_2CH(CH_3)CH_2CH_3$, 0.10 mol, purchased from Tokyo Chemical Industry Co. Ltd.) was added to a tetra-n-butylammonium hydroxide aqueous solution (0.10 mol, purchased from Tokyo Chemical Industry Co. Ltd., 40% aqueous solution, see the chemical formula (F-II)). In this way, an aqueous solution was provided. The provided aqueous solution was dehydrated with an evaporator to provide TBA-3-MPA. The provided TBA-3-MPA was dried under a reduced pressure at a temperature of 40 degrees Celsius. In this way, TBA-3-MPA (0.10 mol) was provided.

Then, the provided TBA-3-MPA (0.10 mol) was dissolved in pure water (2.69 mol) to provide a TBA-3-MPA aqueous solution (42% by weight).

Comparative Example F12

In the comparative example F12, an experiment similar to the inventive example F1 was performed, except for the following matters (I) and (II).

(I) Tetrahydrofuran (19% aqueous solution, 1 gram, namely, approximately 2,635 micromol, melting point: 4.6 degrees Celsius, purchased from Tokyo Chemical Industry Co. Ltd.) was used in place of TBA-2-EBA.

(II) The temperature in the thermostat bath was maintained at 3 degrees Celsius.

Comparative Example F13

In the comparative example F13, an experiment similar to the inventive example F1 was performed, except for the following matters (I)-(IV).

(I) Tetrahydrofuran (19 weight % aqueous solution, 1 gram, namely, approximately 2,635 micromol) was used in place of TBA-2-EBA.

(II) The amount of the silver pentanoate was 10 micromol.

(III) The amount of TBA-F was 100 micromol.

(IV) The temperature in the thermostat bath was maintained at 3 degrees Celsius.

Comparative Example F14

In the comparative example F14, an experiment similar to the inventive example F1 was performed, except for the following matter (I).

(I) Tributylphosphine oxide (26.01 weight percent aqueous solution, 1 gram, namely, approximately 1,190 micromol, melting point: 1.0 degrees Celsius, purchased from Tokyo Chemical Industry Co. Ltd.) represented by the following chemical formula (F-XI) was used in place of TBA-2-EBA.

[Chem. 11]

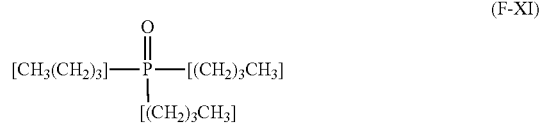

(F-XI)

Comparative Example F15

In the comparative example F15, an experiment similar to the inventive example F1 was performed, except for the following matters (I)-(111).

(I) Tributylphosphine oxide (26.01 weight % aqueous solution, 1 gram, namely, approximately 1,190 micromol) represented by the chemical formula (F-XI) was used in place of TBA-2-EBA.
(II) The amount of the silver pentanoate was 10 micromol.
(III) The amount of TBA-F was 100 micromol.

Comparative Example F16

The comparative example F16 is identical to the comparative example I, which will be described later. For the detail of the comparative example F16, see the comparative example I.

The following Tables 12-13 show the results of the inventive example F20 and the comparative examples F12-F16. The cold storage media according to the comparative examples F12-F16 did not crystallize. Therefore, the supercooling degrees ΔT thereof were not calculated.

TABLE 12

|  | Composition | Ag:F Molar ratio | Latent heat amount (J/gram) | Melting point (° C.) |
| --- | --- | --- | --- | --- |
| Inventive example F20 | TBA-3-MPA: 476 micromol, Silver pentanoate: 1 micromol, TBA-F: 10 micromol, and Water approximately 18,300 micromol | 1:10 | 180 | 4 |
| Comparative example F12 | Tetrahydrofuran: 2,635 micromol, Silver pentanoate: 2 micromol, TBA-F: 20 micromol, and Water: approximately 18,300 micromol | 1:10 | 240 | 4.6 |
| Comparative example F13 | Tetrahydrofuran: 2635 micromol, Silver pentanoate: 10 micromol, TBA-F: 100 micromol, and Water approximately 18,300 micromol | 1:10 | 240 | 4.6 |
| Comparative example F14 | Tributyl phosphine oxide: 1,190 micromol, Silver pentanoate: 2 micromol, TBA-F: 20 micromol, and Water approximately 18,300 micromol | 1:10 | 245 | 7 |
| Comparative example F15 | Tributyl phosphine oxide: 1,190 micromol, Silver pentanoate: 10 micromol, TBA-F: 100 micromol, and Water approximately 18,300 micromol | 1:10 | 245 | 7 |
| Comparative example F16 (namely, Comparative example I) | TBA-2-EBA: 9,785 micromol, Silver 2-ethylbutanoate: 40 micromol, TBA-I: 400 micromol, and Water: approximately 361,100 micromol | — | 177 | 7 |

TABLE 13

|  | ΔT (Kelvin) | Crystallization Start time (minute) | Crystallization Completion time (minute) | Period between the crystallization start time and the crystallization completion time (minute) |
| --- | --- | --- | --- | --- |
| Inventive example F20 | 0 | 3 | 38 | 35 |
| Comparative example F12 | — | Not crystallized | — | — |
| Comparative example F13 | — | Not crystallized | — | — |
| Comparative example F14 | — | Not crystallized | — | — |
| Comparative example F15 | — | Not crystallized | — | — |
| Comparative example F16 (namely, Comparative example I) | — | Not crystallized | — | — |

As is clear from Tables 2-13, the cold storage media according to the inventive examples F1-F20, each of which contain three compositions of silver ions, fluoride ions, and carboxylic acid ions, have a melting point of not less than 4 degrees Celsius and not more than 7 degrees Celsius and a supercooling degree ΔT of not more than 2 degrees Kelvin.

On the other hand, as is clear from the comparative examples F2-F11, the composition which does not contain silver ions has a melting point of approximately 6 degrees Celsius; however, fails to crystallize. For this reason, the composition fails to serve as a cold storage medium.

As is clear from the comparative examples F12-F15, the composition which does not contain tetra-n-butylammonium ions has a melting point of not less than 4 degrees Celsius and not more than 7 degrees Celsius; however, fails to crystallize. For this reason, the composition fails to serve as a cold storage medium.

As is clear from the comparative examples F16 (namely, the comparative example I), the composition which contains iodide ions in place of fluoride ions fails to crystallize. For this reason, the composition fails to serve as a cold storage medium.

Inventive Example CI1

(Synthesis of TBA-2-EBA)
Tetra-n-butylammonium-2-ethylbutanoate (hereinafter, referred to as "TBA-2-EBA") represented by the following chemical formula (CI-I) was synthesized as below.

[Chem. 12]

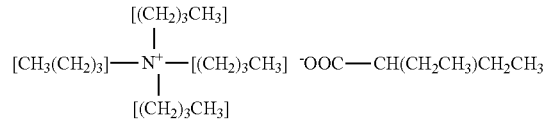

(CI-I)

First, 2-ethylbutanoic acid (chemical formula: HOOC—CH(CH$_2$CH$_3$)CH$_2$CH$_3$, 0.1 mol, purchased from Tokyo Chemical Industry Co. Ltd.) was added to a tetra-n-butylammonium hydroxide aqueous solution (0.1 mol, purchased from Tokyo Chemical Industry Co. Ltd., 40% aqueous solution, hereinafter referred to as "TBA-OH") represented by the following chemical formula (CI-II). In this way, an aqueous solution was provided.

[Chem. 13]

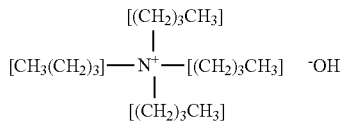

(CI-II)

The provided aqueous solution was dried with an evaporator under a reduced pressure at a temperature of 40 degrees Celsius. In this way, the provided aqueous solution was dehydrated to provide TBA-2-EBA. In this way, TBA-2-EBA (0.1 mol) was provided.

Then, the provided TBA-2-EBA (0.1 mol) was dissolved in pure water (3.85 mol) to provide a TBA-2-EBA aqueous solution (34% by weight).

(Synthesis of Silver Pentanoate)
Silver pentanoate represented by the following chemical formula (CI-III) was synthesized as below.

[Chem. 14]

$$Ag^+\ {}^-OOC—(CH_2)_3CH_3 \qquad (CI\text{-}III)$$

In a darkroom, silver nitrate (0.11 mol, purchased from Wako Pure Chemical Industries, Ltd.) and pentanoic acid (0.10 mol, purchased from Tokyo Chemical Industry Co. Ltd.) were added to water to provide an aqueous solution in which the silver nitrate and the pentanoic acid were mixed with each other. Then, while the aqueous solution was stirred, the aqueous solution was neutralized with a sodium hydroxide aqueous solution (0.09 mol) having a concentration of 1 mol/liter to provide silver pentanoate represented by the chemical formula (CI-III) as a precipitation. The provided precipitation (i.e., the silver pentanoate) was filtered with a filter. The residue was washed with distilled water and subsequently was dried. In this way, the silver pentanoate (0.10 mol) was provided.

(Purchase of TBA-CI)
Tetra-n-butylammonium chloride aqueous solution (0.287 mol, 75% aqueous solution, hereinafter, referred to as "TBA-CI") represented by the following chemical formula (CI-IV) was purchased from Sigma Aldrich.

[Chem. 15]

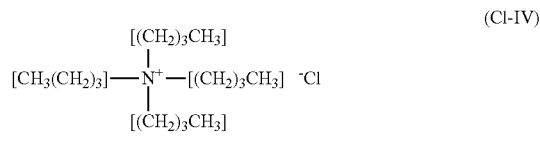

(CI-IV)

(Preparation of Cold Storage Medium)
The cold storage medium according to the inventive example CI1 was prepared as below. First, the silver pentanoate (2.0 micromol) was dissolved in the TBA-CI aqueous solution (20 micromol) to provide a mixture. Note that silver carboxylate such as silver pentanoate is insoluble in both a hydrophilic solvent (e.g., water) and a hydrophobic solvent (e.g., oil); however, the silver carboxylate is soluble in a quaternary ammonium salt aqueous solution.

Then, the mixture was added to the TBA-2-EBA aqueous solution (TBA-2-EBA: 476 micromol). Just after the addition, the aqueous solution got cloudy; however, after several hours, the aqueous solution became transparent. Precipitation was slightly observed in the aqueous solution. The aqueous solution was left at a room temperature over 24 hours. In this way, the cold storage medium according to the inventive example CI1 was prepared. As is clear from above, the cold storage medium according to the inventive example CI1 has a composition shown in the following Table 14.

TABLE 14

| Name of Material | Amount |
| --- | --- |
| TBA quaternary ammonium ions | 496 micromol |
| TBA-2-EBA ions | 476 micromol |
| Pentanoic acid ions | 2 micromol |
| Silver ions | 2 micromol |
| Chloride ions | 20 micromol |
| Water (derived from TBA-2-EBA aqueous solution) | Approximately 18,300 micromol |

(Measurement of Melting Point and Latent Heat Amount)

The melting point and the latent heat amount of the cold storage medium according to the inventive example CI1 were measured as below with a differential scanning calorimeter. First, the cold storage medium according to the inventive example CI1 (10 milligrams) was put into a container formed of aluminum. Then, the container was sealed with a lid.

The container was set in a differential scanning calorimeter (purchased from PerkinElmer, trade name: DSC-8500). The cold storage medium put in the container was cooled from a room temperature to minus 20 degrees Celsius at a rate of 2 degrees Celsius/minute. Then, the cold storage medium was left at rest at a temperature of minus 20 degrees Celsius for five minutes. In this way, the present inventors believed that the cold storage medium crystallized to be a semiclathrate hydrate. Finally, the cold storage medium was warmed from minus 20 degrees Celsius to a room temperature at a rate of 2 degrees Celsius/minute. In this way, the crystallized cold storage medium was melted.

On the basis of an endothermic peak output from the differential scanning calorimeter in a period during which the cold storage medium (namely, the semiclathrate hydrate cold storage medium) was melted, the melting point of the cold storage medium according to the inventive example CI1 was identified and the latent heat amount of the cold storage medium according to the inventive example CI1 was calculated. As a result, the melting point of the cold storage medium according to the inventive example CI1 was 6 degrees Celsius. The latent heat amount of the melting point of the cold storage medium according to the inventive example CI1 was 178 joules/gram.

(Measurement of Supercooling Degree ΔT)

The supercooling degree ΔT of the cold storage medium according to the inventive example CI1 was measured as below. First, the cold storage medium according to the inventive example CI1 (0.5 grams) was put into a glass bottle having a volume of 9 milliliters. Then, the glass bottle was sealed with a lid.

The glass bottle was put into a thermostat bath (purchased from ESPEC Corp., trade name: SU-241). The temperature in the thermostat bath was 20 degrees Celsius.

After the temperature in the thermostat bath was lowered to 5 degrees Celsius at a rate of minus 1 degree Celsius/minute, the temperature in the thermostat bath was maintained at 5 degrees Celsius.

When six minutes elapsed from the beginning of the maintenance of the temperature in the thermostat bath at 5 degrees Celsius, the cold storage medium according to the inventive example CI1 crystallized spontaneously. With the crystallization, the cold storage medium according to the inventive example CI1 released crystallization heat. Due to the release of the crystallization heat, the temperature of the cold storage medium according to the inventive example CI1 was raised. Finally, the present inventors visually confirmed the completion of the crystallization of the cold storage medium according to the inventive example CI1. The period between the beginning and the completion of the crystallization was 36 minutes.

As described above, since the cold storage medium according to the inventive example CI1 crystallized spontaneously at a temperature of 5 degrees Celsius, the cold storage medium according to the inventive example CI1 had a supercooling degree ΔT of 1 Kelvin (=(the melting point of 6 degrees Celsius)-(the crystallization point of 5 degrees Celsius).

Inventive Example CI2

In the inventive example CI2, an experiment similar to the inventive example CI1 was performed except that silver heptanoate represented by the following chemical formula (CI-V) was used in place of the silver pentanoate.

[Chem. 16]

$$Ag^+ {}^-OOC-(CH_2)_5CH_3 \quad\quad\quad (CI\text{-}V)$$

(Synthesis of Silver Heptanoate)

The silver heptanoate was synthesized as below. In the darkroom, silver nitrate (0.11 mol, purchased from Wako Pure Chemical Industries, Ltd.) and heptanoic acid (0.10 mol, purchased from Tokyo Chemical Industry Co. Ltd.) were added to water to provide an aqueous solution in which the silver nitrate and the heptanoic acid were mixed. Then, while the aqueous solution was stirred, the aqueous solution was neutralized with a sodium hydroxide aqueous solution (0.09 mol) having a concentration of 1 mol/liter to provide silver heptanoate represented by the chemical formula (CI-V) as a precipitation. The provided precipitation (i.e., the silver heptanoate) was filtered with a filter. The residue was washed with distilled water and subsequently was dried. In this way, the silver heptanoate (0.10 mol) was provided.

Inventive Example CI3

In the inventive example CI3, an experiment similar to the inventive example CI1 was performed except that silver 2-methylbutanoate represented by the following chemical formula (CI-VI) (hereinafter, referred to as "2-MBA silver salt") was used in place of the silver pentanoate.

[Chem. 17]

$$Ag^+ {}^-OOC-CH(CH_3)CH_2CH_3 \quad\quad\quad (CI\text{-}VI)$$

(Synthesis of 2-MBA Silver Salt)

The 2-MBA silver salt was synthesized as below. In the darkroom, silver nitrate (0.11 mol, purchased from Wako Pure Chemical Industries, Ltd.) and 2-methylbutanoic acid (0.1 mol, purchased from Tokyo Chemical Industry Co. Ltd.) were added to water to provide an aqueous solution in which the silver nitrate and the 2-methylbutanoic acid were mixed. Then, while the aqueous solution was stirred, the aqueous solution was neutralized with a sodium hydroxide aqueous solution (0.09 mol) having a concentration of 1 mol/liter to provide a 2-MBA silver salt represented by the chemical formula (CI-VI) as a precipitation. The provided precipitation (i.e., the 2-MBA silver salt) was filtered with a filter. The residue was washed with distilled water and subsequently was dried. In this way, the 2-MBA silver salt (0.10 mol) was provided.

Inventive Example CI4

In the inventive example CI4, an experiment similar to the inventive example CI1 was performed except that silver 2-ethylbutanoate represented by the following chemical formula (CI-VII) (hereinafter, referred to as "2-EBA silver salt") was used in place of the silver pentanoate.

[Chem. 18]

$$Ag^+ {}^-OOC-CH(CH_2CH_3)CH_2CH_3 \quad\quad\quad (CI\text{-}VII)$$

(Synthesis of 2-EBA Silver Salt)

The 2-EBA silver salt was synthesized as below. In the darkroom, silver nitrate (0.11 mol, purchased from Wako Pure Chemical Industries, Ltd.) and 2-ethylbutanoic acid (0.10 mol, purchased from Tokyo Chemical Industry Co. Ltd.) were added to water to provide an aqueous solution in which the silver nitrate and the 2-ethylbutanoic acid were mixed. Then, while the aqueous solution was stirred, the aqueous solution was neutralized with a sodium hydroxide aqueous solution (0.09 mol) having a concentration of 1 mol/liter to provide a 2-EBA silver salt represented by the chemical formula (CI-VII) as a precipitation. The provided precipitation (i.e., the 2-EBA silver salt) was filtered with a filter. The residue was washed with distilled water and subsequently was dried. In this way, the 2-EBA silver salt (0.10 mol) was provided.

Note that each of the cold storage media according to the inventive examples CI1-CI3 contain two kinds of organic anions, whereas the cold storage media according to the inventive example CI4 contains one kind of organic anion (namely, 2-methylbutanoic acid anion).

The following Tables 15-16 show the results of the inventive examples CI1-CI4.

TABLE 15

|  | Composition | Ag:Cl Molar ratio | Latent heat amount (J/gram) | Melting point (° C.) |
|---|---|---|---|---|
| Inventive example CI1 | TBA-2-EBA: 476 micromol, Silver pentanoate: 2 micromol, TBA-Cl 20: micromol, and Water: approximately 18,300 micromol | 1:10 | 178 | 6 |
| Inventive example CI2 | TBA-2-EBA: 476 micromol, Silver heptanoate: 2 micromol, TBA-Cl: 20 micromol, and Water: approximately 18,300 micromol | 1:10 | 178 | 6 |
| Inventive example CI3 | TBA-2-EBA: 476 micromol, 2-MBA silver salt: 2 micromol, TBA-Cl: 20 micromol, and Water: approximately 18,300 micromol | 1:10 | 183 | 6 |
| Inventive example CI4 | TBA-2-EBA: 476 micromol, 2-EBA silver salt: 2 micromol, TBA-Cl: 20 micromol, and Water: approximately 18,300 micromol | 1:10 | 182 | 6 |

TABLE 16

|  | ΔT (Kelvin) | Crystallization Start time (minute) | Crystallization Completion time (minute) | Period between the crystallization start time and the crystallization completion time (minute) |
|---|---|---|---|---|
| Inventive example CI1 | 1 | 25 | 67 | 42 |
| Inventive example CI2 | 1 | 24 | 62 | 38 |
| Inventive example CI3 | 1 | 29 | 70 | 41 |
| Inventive example CI4 | 1 | 26 | 66 | 40 |

Inventive Examples CI5-CI8

In the inventive examples CI5-CI8, experiments similar to the inventive examples CI1-CI4 were performed respectively, except that the amount of the TBA-Cl aqueous solution was not 20 micromol but 40 micromol.

The following Tables 17-18 show the results of the inventive examples CI5-CI8.

TABLE 17

|  | Composition | Ag:Cl Molar ratio | Latent heat amount (J/gram) | Melting point (° C.) |
|---|---|---|---|---|
| Inventive example CI5 | TBA-2-EBA: 476 micromol, Silver pentanoate: 2 micromol, TBA-Cl: 40 micromol, and Water: approximately 18,300 micromol | 1:20 | 178 | 7 |
| Inventive example CI6 | TBA-2-EBA: 476 micromol, Silver heptanoate: 2 micromol, TBA-Cl: 40 micromol, and Water: approximately 18,300 micromol | 1:20 | 174 | 7 |
| Inventive example CI7 | TBA-2-EBA: 476 micromol, MBA silver salt: 2 micromol, TBA-Cl: 40 micromol, and Water: approximately 18,300 micromol | 1:20 | 180 | 7 |
| Inventive example CI8 | TBA-2-EBA: 476 micromol, 2-EBA silver salt: 2 micromol, TBA-Cl: 40 micromol, and Water: approximately 18,300 micromol | 1:20 | 175 | 7 |

TABLE 18

|  | ΔT (Kelvin) | Crystallization Start time (minute) | Crystallization Completion time (minute) | Period between the crystallization start time and the crystallization completion time (minute) |
|---|---|---|---|---|
| Inventive example CI5 | 2 | 26 | 66 | 40 |
| Inventive example CI6 | 2 | 30 | 70 | 40 |
| Inventive example CI7 | 2 | 24 | 63 | 39 |
| Inventive example CI8 | 2 | 24 | 62 | 38 |

Inventive Examples CI9-CI12

In the inventive examples CI9-CI12, experiments similar to the inventive examples CI1-CI4 were performed respectively, except that the amount of the organic silver salt (namely, the silver pentanoate, the silver heptanoate, the 2-MBA silver salt, or the 2-EBA silver salt) was not 2 micromol but 1 micromol, and that the amount of the TBA-Cl was not 20 micromol but 10 micromol.

The following Tables 19-20 show the results of the inventive examples CI9-CI12.

TABLE 19

|  | Composition | Ag:Cl Molar ratio | Latent heat amount (J/gram) | Melting point (° C.) |
|---|---|---|---|---|
| Inventive example CI9 | TBA-2-EBA: 476 micromol, Silver pentanoate: 1 micromol, TBA-Cl: 10 micromol, and Water: approximately 18,300 micromol | 1:10 | 184 | 6 |
| Inventive example CI10 | TBA-2-EBA: 476 micromol, Silver heptanoate: 1 micromol, TBA-Cl: 10 micromol, and Water: approximately 18,300 micromol | 1:10 | 176 | 6 |
| Inventive example CI11 | TBA-2-EBA: 476 micromol, 2-MBA silver salt: 1 micromol, TBA-Cl: 10 micromol, and Water: approximately 18,300 micromol | 1:10 | 176 | 6 |
| Inventive example CI12 | TBA-2-EBA: 476 micromol, 2-EBA silver salt: 1 micromol, TBA-Cl: 10 micromol, and Water: approximately 18,300 micromol | 1:10 | 177 | 6 |

TABLE 20

|  | ΔT (Kelvin) | Crystallization Start time (minute) | Crystallization Completion time (minute) | Period between the crystallization start time and the crystallization completion time (minute) |
|---|---|---|---|---|
| Inventive example CI9 | 1 | 38 | 140 | 102 |

TABLE 20-continued

| | ΔT (Kelvin) | Crystallization Start time (minute) | Crystallization Completion time (minute) | Period between the crystallization start time and the crystallization completion time (minute) |
|---|---|---|---|---|
| Inventive example CI10 | 1 | 51 | 165 | 114 |
| Inventive example CI11 | 1 | 35 | 150 | 115 |
| Inventive example CI12 | 1 | 40 | 153 | 113 |

Inventive Example CI13

(Preparation of TBA-2-EBA Aqueous Solution)
The TBA-2-EBA provided in the inventive example CI1 (0.1 mol) was dissolved in water (3.85 mol). In this way, a TBA-2-EBA aqueous solution (34% by weight) was provided.

(Preparation of Cold Storage Medium)
The cold storage medium according to the inventive example CI13 was prepared as below. First, the silver pentanoate (1.2 micromol) was dissolved in the TBA-CI aqueous solution (24 micromol) to provide a mixture. Then, the mixture was added to the TBA-2-EBA aqueous solution (1,400 micromol). The aqueous solution was left at a room temperature over 24 hours. In this way, the cold storage medium according to the inventive example CI13 was prepared.

(Measurement of Melting Point and Latent Heat Amount)
The melting point and the latent heat amount of the cold storage medium according to the inventive example CI13 were measured as below with the differential scanning calorimeter. First, the cold storage medium according to the inventive example CI13 (10 milligrams) was put into a container formed of aluminum. Then, the container was sealed with a lid.

The container was set in the differential scanning calorimeter similarly to the case of the inventive example CI1. The cold storage medium put in the container was cooled from a room temperature to minus 20 degrees Celsius at a rate of 2 degrees Celsius/minute. Then, the cold storage medium was left at rest at a temperature of minus 20 degrees Celsius for five minutes. In this way, the present inventors believed that the cold storage medium crystallized to be a semiclathrate hydrate. Finally, the cold storage medium was warmed from minus 20 degrees Celsius to a room temperature at a rate of 2 degrees Celsius/minute. In this way, the crystallized cold storage medium was melted. According to the differential scanning calorimeter, the melting point and the heat latent amount of the cold storage medium according to the inventive example CI13 were 6 degrees Celsius and 175 joules/gram, respectively. Therefore, the cold storage medium according to the inventive example CI13 had a supercooling degree ΔT of 1 degree Kelvin.

Inventive Example CI14

In the inventive example CI14, an experiment similar to the inventive example CI13 was performed, except that the amounts of the silver pentanoate and the TBA-CI aqueous solution were 2.4 micromol and 12 micromol, respectively.

Inventive Example CI15

In the inventive example CI15, an experiment similar to the inventive example CI13 was performed, except that the amount of the silver pentanoate was 2.4 micromol.

Inventive Example CI16

In the inventive example CI16, an experiment similar to the inventive example CI13 was performed, except that silver acetate (2.4 micromol) represented by the chemical formula (CI-VIII) was used in place of the silver pentanoate (1.2 micromol) and that the amount of the TBA-CI aqueous solution was 12 micromol.

[Chem. 19]

$$Ag^+{}^-OOC\text{---}CH_3 \quad (CI\text{-}VIII)$$

(Synthesis of Silver Acetate)
The silver acetate was synthesized as below. In the darkroom, silver nitrate (0.11 mol, purchased from Wako Pure Chemical Industries, Ltd.) and acetic acid (0.10 mol, purchased from Tokyo Chemical Industry Co. Ltd.) were added to water to provide an aqueous solution in which the silver nitrate and the acetic acid were mixed. Then, while the aqueous solution was stirred, the aqueous solution was neutralized with a sodium hydroxide aqueous solution (0.09 mol) having a concentration of 1 mol/liter to provide silver acetate represented by the chemical formula (CI-VIII) as a precipitation. The provided precipitation (i.e., the silver acetate) was filtered with a filter. The residue was washed with distilled water and subsequently was dried. In this way, the silver acetate (0.10 mol) was provided.

Inventive Example CI17

In the inventive example CI17, an experiment similar to the inventive example CI13 was performed, except that the silver acetate (2.4 micromol) represented by the chemical formula (CI-VIII) was used in place of the silver pentanoate (1.2 micromol).

Inventive Example CI18

In the inventive example CI18, an experiment similar to the inventive example CI13 was performed, except that silver propanoate (2.4 micromol) represented by the chemical formula (CI-IX) was used in place of the silver pentanoate (1.2 micromol) and that the amount of the TBA-CI aqueous solution was 12 micromol.

[Chem. 20]

$$Ag^+{}^-OOC\text{---}CH_2CH_3 \quad (CI\text{-}IX)$$

(Synthesis of Silver Propanoate)
The silver propanoate was synthesized as below. In the darkroom, silver nitrate (0.11 mol, purchased from Wako Pure Chemical Industries, Ltd.) and propanoic acid (0.10 mol, purchased from Tokyo Chemical Industry Co. Ltd.) were added to water to provide an aqueous solution in which the silver nitrate and the propanoic acid were mixed. Then, while the aqueous solution was stirred, the aqueous solution was neutralized with a sodium hydroxide aqueous solution (0.09 mol) having a concentration of 1 mol/liter to provide silver propanoate represented by the chemical formula (CI- IX) as a precipitation. The provided precipitation (i.e., the silver propanoate) was filtered with a filter. The residue was washed with distilled water and subsequently was dried. In this way, the silver propanoate (0.10 mol) was provided.

Inventive Example CI19

In the inventive example CI19, an experiment similar to the inventive example CI13 was performed, except that the silver propanoate (2.4 micromol) represented by the chemical formula (CI-IX) was used in place of the silver pentanoate (1.2 micromol).

The following Tables 21-22 show the results of the inventive examples CI13-CI19.

TABLE 21

| | Composition | Ag:Cl Molar ratio | Latent heat amount (J/gram) | Melting point (° C.) |
|---|---|---|---|---|
| Inventive example CI13 | TBA-2-EBA: 1,400 micromol, Silver pentanoate: 1.2 micromol, TBA-Cl: 24 micromol, and Water: approximately 18,300 micromol | 1:20 | 180 | 6 |
| Inventive example CI14 | TBA-2-EBA: 1,400 micromol, Silver pentanoate: 2.4 micromol, TBA-Cl 12 micromol, and Water approximately 18,300 micromol | 1:5 | 181 | 6 |
| Inventive example CI15 | TBA-2-EBA: 1,400 micromol, Silver pentanoate: 2.4 micromol, TBA-Cl: 24 micromol, and Water: approximately 18,300 micromol | 1:10 | 184 | 6 |
| Inventive example CI16 | TBA-2-EBA: 1,400 micromol, Silver acetate: 2.4 micromol, TBA-Cl: 12 micromol, and Water: approximately 18,300 micromol | 1:5 | 170 | 6 |
| Inventive example CI17 | TBA-2-EBA: 1,400 micromol, Silver acetate: 2.4 micromol, TBA-Cl: 24 micromol, and Water: approximately 18,300 micromol | 1:10 | 174 | 6 |
| Inventive example CI18 | TBA-2-EBA: 1,400 micromol, Silver propanoate: 2.4 micromol, TBA-Cl: 12 micromol, and Water: approximately 18,300 micromol | 1:5 | 178 | 6 |
| Inventive example CI19 | TBA-2-EBA: 1,400 micromol, Silver propanoate: 2.4 micromol, TBA-Cl: 24 micromol, and Water approximately 18,300 micromol | 1:10 | 175 | 6 |

TABLE 22

| | ΔT (Kelvin) | Crystallization Start time (minute) | Crystallization Completion time (minute) | Period between the crystallization start time and the crystallization completion time (minute) |
|---|---|---|---|---|
| Inventive example CI13 | 1 | 11 | 52 | 41 |
| Inventive example CI14 | 1 | 25 | 78 | 53 |
| Inventive example CI15 | 1 | 14 | 54 | 40 |
| Inventive example CI16 | 1 | 30 | 130 | 100 |
| Inventive example CI17 | 1 | 12 | 63 | 51 |
| Inventive example CI18 | 1 | 30 | 125 | 95 |
| Inventive example CI19 | 1 | 31 | 60 | 30 |

Comparative Example CI1

In the comparative example CI1, an experiment similar to the inventive example CI1 was performed, except that neither the silver pentanoate nor the TBA-Cl was used. In other words, the cold storage medium according to the comparative example CI 1 contained TBA-2-EBA only.

Comparative Example CI2

In the comparative example CI2, an experiment similar to the inventive example CI1 was performed, except for the following two matters (I) and (II).

(I) Diacetoxyzirconium(IV) oxide (1.0 micromol, purchased from Tokyo Chemical Industry Co. Ltd.) represented by the chemical formula $ZrO(C_2H_3O_2)_2$ was used in place of the silver pentanoate (2.0 micromol).

(II) The amount of TBA-Cl was not 20 micromol but 10 micromol.

Comparative Example CI3

In the comparative example CI3, an experiment similar to the inventive example CI1 was performed, except for the following two matters (I) and (II).

(I) Gold triacetate (1.0 micromol, purchased from Alfa Aesar) was used in place of the silver pentanoate (2.0 micromol).

(II) The amount of TBA-CI was not 20 micromol but 10 micromol.

Comparative Example CI4

In the comparative example CI4, an experiment similar to the inventive example CI1 was performed, except for the following two matters (I) and (II).

(I) Palladium(II) acetate (1.0 micromol, purchased from Tokyo Chemical Industry Co. Ltd.) was used in place of the silver pentanoate (2.0 micromol).

(II) The amount of TBA-CI was not 20 micromol but 10 micromol.

Comparative Example CI5

In the comparative example CI5, an experiment similar to the inventive example CI1 was performed, except for the following two matters (I) and (II).

(I) Iridium acetate (1.0 micromol, purchased from Wako Pure Chemical Industries, Ltd.) was used in place of the silver pentanoate (2.0 micromol).

(II) The amount of TBA-CI was not 20 micromol but 10 micromol.

Comparative Example CI6

In the comparative example CI6, an experiment similar to the inventive example CI1 was performed, except for the following two matters (I) and (II).

(I) Zinc acetate (1.0 micromol, purchased from Wako Pure Chemical Industries, Ltd.) was used in place of the silver pentanoate (2.0 micromol).

(II) The amount of TBA-CI was not 20 micromol but 10 micromol.

Comparative Example CI7

In the comparative example CI7, an experiment similar to the inventive example CI1 was performed, except for the following two matters (I) and (II).

(I) Nickel acetate (1.0 micromol, purchased from Wako Pure Chemical Industries, Ltd.) was used in place of the silver pentanoate (2.0 micromol).

(II) The amount of TBA-CI was not 20 micromol but 10 micromol.

Comparative Example CI8

In the comparative example CI8, an experiment similar to the inventive example CI1 was performed, except for the following two matters (I) and (II).

(I) Manganese acetate (1.0 micromol, purchased from Wako Pure Chemical Industries, Ltd.) was used in place of the silver pentanoate (2.0 micromol).

(II) The amount of TBA-CI was not 20 micromol but 10 micromol.

Comparative Example CI9

In the comparative example CI9, an experiment similar to the inventive example CI1 was performed, except for the following two matters (I) and (II).

(I) Cobalt acetate (1.0 micromol, purchased from Wako Pure Chemical Industries, Ltd.) was used in place of the silver pentanoate (2.0 micromol).

(II) The amount of TBA-CI was not 20 micromol but 10 micromol.

Comparative Example CI10

In the comparative example CI10, an experiment similar to the inventive example CI1 was performed, except for the following two matters (I) and (II).

(I) Cupper(I) acetate (1.0 micromol, purchased from Wako Pure Chemical Industries, Ltd.) was used in place of the silver pentanoate (2.0 micromol).

(II) The amount of TBA-CI was not 20 micromol but 10 micromol.

Comparative Example CI11

In the comparative example CI11, an experiment similar to the inventive example CI1 was performed, except for the following two matters (I) and (II).

(I) Cupper(II) acetate (1.0 micromol, purchased from Wako Pure Chemical Industries, Ltd.) was used in place of the silver pentanoate (2.0 micromol).

(II) The amount of TBA-CI was not 20 micromol but 10 micromol.

The following Tables 23-24 shows the results of the comparative examples CI1-CI11. The cold storage media according to the comparative examples CI1-CI11 did not crystallize. Therefore, the supercooling degrees $\Delta T$ thereof were not calculated.

TABLE 23

|  | Composition | Ag:Cl Molar ratio | Latent heat amount (J/gram) | Melting point (° C.) |
|---|---|---|---|---|
| Comparative example CI1 | TBA-2-EBA: 476 micromol | — | 178 | 6 |
| Comparative example CI2 | TBA-2-EBA: 476 micromol, Diacetoxyzirconium(IV) oxide: 1 micromol, TBA-Cl: 10 micromol, and Water: approximately 18,300 micromol | 1:10 | 173 | 6 |
| Comparative example CI3 | TBA-2-EBA: 476 micromol, Gold triacetate: 1 micromol, TBA-Cl: 10 micromol, and Water: approximately 18,300 micromol | 1:10 | 173 | 6 |

TABLE 23-continued

|  | Composition | Ag:Cl Molar ratio | Latent heat amount (J/gram) | Melting point (° C.) |
|---|---|---|---|---|
| Comparative example CI4 | TBA-2-EBA: 476 micromol, Palladium(II) acetate: 1 micromol, TBA-Cl: 10 micromol, and Water: approximately 18,300 micromol | 1:10 | 176 | 6 |
| Comparative example CI5 | TBA-2-EBA: 476 micromol, Iridium acetate: 1 micromol, TBA-Cl: 10 micromol, and Water: approximately 18,300 micromol | 1:10 | 178 | 6 |
| Comparative example CI6 | TBA-2-EBA: 476 micromol, Zinc acetate: 1 micromol, TBA-Cl: 10 micromol, and Water: approximately 18,300 micromol | 1:10 | 170 | 6 |
| Comparative example CI7 | TBA-2-EBA: 476 micromol, Nickel acetate: 1 micromol, TBA-Cl: 10 micromol, and Water: approximately 18,300 micromol | 1:10 | 173 | 6 |
| Comparative example CI8 | TBA-2-EBA: 476 micromol, Manganese acetate: 1 micromol, TBA-Cl: 10 micromol, and Water: approximately 18,300 micromol | 1:10 | 174 | 6 |
| Comparative example CI9 | TBA-2-EBA: 476 micromol, Cobalt acetate: 1 micromol, TBA-Cl: 10 micromol, and Water: approximately 18,300 micromol | 1:10 | 169 | 6 |
| Comparative example CI10 | TBA-2-EBA: 476 micromol, Copper acetate (I): 1 micromol, TBA-Cl: 10 micromol, and Water: approximately 18,300 micromol | 1:10 | 168 | 6 |
| Comparative example CI11 | TBA-2-EBA: 476 micromol, Copper acetate (II): 1 micromol, TBA-Cl: 10 micromol, and Water: approximately 18,300 micromol | 1:10 | 169 | 6 |

TABLE 24

|  | ΔT (Kelvin) | Crystallization Start time (minute) | Crystallization Completion time (minute) | Period between the crystallization start time and the crystallization completion time (minute) |
|---|---|---|---|---|
| Comparative example CI1 | — | Not crystallized | — | — |
| Comparative example CI2 | — | Not crystallized | — | — |
| Comparative example CI3 | — | Not crystallized | — | — |
| Comparative example CI4 | — | Not crystallized | — | — |
| Comparative example CI5 | — | Not crystallized | — | — |
| Comparative example CI6 | — | Not crystallized | — | — |
| Comparative example CI7 | — | Not crystallized | — | — |
| Comparative example CI8 | — | Not crystallized | — | — |
| Comparative example CI9 | — | Not crystallized | — | — |
| Comparative example CI10 | — | Not crystallized | — | — |
| Comparative example CI11 | — | Not crystallized | — | — |

Inventive Example CI20

In the inventive example CI20, an experiment similar to the inventive example CI1 was performed, except for the following matters (I)-(IV).

(I) Tetra-n-butylammonium-3-methylpentanoate (hereinafter, referred to as "TBA-3-MPA") represented by the following chemical formula (CI-X) was used in place of TBA-2-EBA.

[Chem. 21]

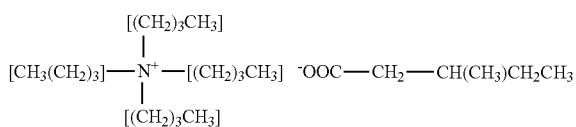

(CI-X)

(II) The amount of the silver pentanoate was 1 micromol.

(III) The amount of TBA-CI was not 20 micromol but 10 micromol.

(IV) The temperature in the thermostat bath was maintained at 4 degrees Celsius.

(Synthesis of TBA-3-MPA)

TBA-3-MPA was synthesized as below.

First, 3-methyl-pentanoic acid (chemical formula: HOOC—$CH_2CH(CH_3)CH_2CH_3$, 0.10 mol, purchased from Tokyo Chemical Industry Co. Ltd.) was added to a tetra-n-butylammonium hydroxide aqueous solution (0.10 mol, purchased from Tokyo Chemical Industry Co. Ltd., 40% aqueous solution, see the chemical formula (CI-II)). In this way, an aqueous solution was provided. The provided aqueous solution was dehydrated with an evaporator to provide TBA-3-MPA. The provided TBA-3-MPA was dried under a reduced pressure at a temperature of 40 degrees Celsius. In this way, TBA-3-MPA (0.10 mol) was provided.

Then, the provided TBA-3-MPA (0.10 mol) was dissolved in pure water (2.69 mol) to provide a TBA-3-MPA aqueous solution (42% by weight).

Comparative Example CI112

In the comparative example CI12, an experiment similar to the inventive example CI1 was performed, except for the following matters (I) and (II).

(I) Tetrahydrofuran (19 weight % aqueous solution, 1 gram, namely, approximately 2,635 micromol, melting point: 4.6 degrees Celsius, purchased from Tokyo Chemical Industry Co. Ltd.) was used in place of TBA-2-EBA.

(II) The temperature in the thermostat bath was maintained at 3 degrees Celsius.

Comparative Example CI13

In the comparative example CI13, an experiment similar to the inventive example CI1 was performed, except for the following matters (I)-(IV).

(I) Tetrahydrofuran (19% aqueous solution, 1 gram, namely, approximately 2,635 micromol) was used in place of TBA-2-EBA.

(II) The amount of the silver pentanoate was 10 micromol.

(III) The amount of TBA-CI was 100 micromol.

(IV) The temperature in the thermostat bath was maintained at 3 degrees Celsius.

Comparative Example CI14

In the comparative example CI14, an experiment similar to the inventive example CI1 was performed, except for the following matter (I).

(I) Tributylphosphine oxide (26.01 weight percent aqueous solution, 1 gram, namely, approximately 1,190 micromol, melting point: 1.0 degrees Celsius, purchased from Tokyo Chemical Industry Co. Ltd.) represented by the following chemical formula (CI-XI) was used in place of TBA-2-EBA.

[Chem. 22]

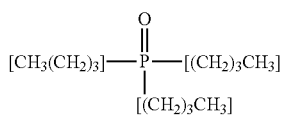

(CI-XI)

Comparative Example CI115

In the comparative example CI15, an experiment similar to the inventive example CI1 was performed, except for the following matters (I)-(III).

(I) Tributylphosphine oxide (26.01% aqueous solution, 1 gram, namely, approximately 1,190 micromol) represented by the chemical formula (CI-XI) was used in place of TBA-2-EBA.

(II) The amount of the silver pentanoate was 10 micromol.

(III) The amount of TBA-CI was 100 micromol.

Comparative Example CI16

The comparative example CI16 is identical to the comparative example I, which will be described later. For the detail of the comparative example CI16, see the comparative example I.

The following Tables 25-26 show the results of the inventive example CI20 and the comparative examples CI12-CI16. The cold storage media according to the comparative examples CI12-CI16 did not crystallize. Therefore, the supercooling degrees ΔT thereof were not calculated.

TABLE 25

| | Composition | Ag:Cl Molar ratio | Latent heat amount (J/gram) | Melting point (° C.) |
|---|---|---|---|---|
| Inventive example CI20 | TBA-3-MPA: 476 micromol, Silver pentanoate: 1 micromol, TBA-Cl: 10 micromol, and Water approximately 18,300 micromol | 1:10 | 182 | 3 |

TABLE 25-continued

|  | Composition | Ag:Cl Molar ratio | Latent heat amount (J/gram) | Melting point (° C.) |
|---|---|---|---|---|
| Comparative example CI12 | Tetrahydrofuran: 2,635 micromol, Silver pentanoate: 2 micromol, TBA-Cl: 20 micromol, and Water: approximately 18,300 micromol | 1:10 | 244 | 4.6 |
| Comparative example CI13 | Tetrahydrofuran: 2635 micromol, Silver pentanoate: 10 micromol, TBA-Cl: 100 micromol, and Water approximately 18,300 micromol | 1:10 | 242 | 4.6 |
| Comparative example CI14 | Tributyl phosphine oxide: 1,190 micromol, Silver pentanoate: 2 micromol, TBA-Cl: 20 micromol, and Water approximately 18,300 micromol | 1:10 | 248 | 7 |
| Comparative example CI15 | Tributyl phosphine oxide: 1,190 micromol, Silver pentanoate: 10 micromol, TBA-Cl: 100 micromol, and Water: approximately 18,300 micromol | 1:10 | 245 | 7 |
| Comparative example CI16 (namely, Comparative example I) | TBA-2-EBA: 9,785 micromol, Silver 2-ethylbutanoate: 40 micromol, TBA-I: 400 micromol, and Water: approximately 361,100 micromol | — | 177 | 7 |

TABLE 26

|  | $\Delta T$ (Kelvin) | Crystallization Start time (minute) | Crystallization Completion time (minute) | Period between the crystallization start time and the crystallization completion time (minute) |
|---|---|---|---|---|
| Inventive example CI20 | 0 | 22 | 69 | 47 |
| Comparative example CI12 | — | Not crystallized | — | — |
| Comparative example CI13 | — | Not crystallized | — | — |
| Comparative example CI14 | — | Not crystallized | — | — |
| Comparative example CI15 | — | Not crystallized | — | — |
| Comparative example CI16 (namely, Comparative example I) | — | Not crystallized | — | — |

As is clear from Tables 15-26, the cold storage media according to the inventive examples CI1-CI20, each of which contain three compositions of silver ions, chloride ions, and carboxylic acid ions, have a melting point of not less than 34 degrees Celsius and not more than 7 degrees Celsius and a supercooling degree ΔT of not more than 2 degrees Kelvin.

On the other hand, as is clear from the comparative examples CI2-CI11, the composition which does not contain silver ions has a melting point of approximately 6 degrees Celsius; however, fails to crystallize. For this reason, the composition fails to serve as a cold storage medium.

As is clear from the comparative examples CI12-CI15, the composition which does not contain tetra-n-butylammonium ions has a melting point of not less than 4 degrees Celsius and not more than 7 degrees Celsius; however, fails to crystallize. For this reason, the composition fails to serve as a cold storage medium.

As is clear from the comparative examples CI16 (namely, the comparative example I), the composition which contains iodide ions in place of chloride ions fails to crystallize. For this reason, the composition fails to serve as a cold storage medium.

Inventive Example Br1

(Synthesis of TBA-2-EBA)
Tetra-n-butylammonium-2-ethylbutanoate (hereinafter, referred to as "TBA-2-EBA") represented by the following chemical formula (Br-I) was synthesized as below.

[Chem. 23]

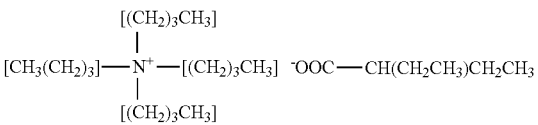

First, 2-ethylbutanoic acid (chemical formula: HOOC—CH(CH$_2$CH$_3$)CH$_2$CH$_3$, 0.1 mol, purchased from Sigma Aldrich) was added to a tetra-n-butylammonium hydroxide aqueous solution (0.1 mol, purchased from Tokyo Chemical Industry Co., Ltd., 40% aqueous solution, hereinafter referred to as "TBA-OH") represented by the following chemical formula (Br-II). In this way, an aqueous solution was provided.

[Chem. 24]

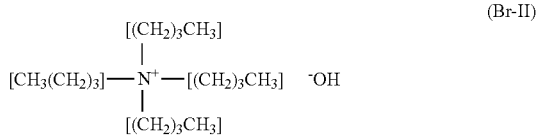

(Br-II)

The provided aqueous solution was dried with an evaporator under a reduced pressure at a temperature of 40 degrees Celsius. In this way, the provided aqueous solution was dehydrated to provide TBA-2-EBA. In this way, TBA-2-EBA (0.1 mol) was provided.

Then, the provided TBA-2-EBA (0.1 mol) was dissolved in pure water (3.69 mol) to provide a TBA-2-EBA aqueous solution (35% by weight).

(Synthesis of Silver 2-Ethylbutanoate)

silver 2-ethylbutanoate represented by the following chemical formula (Br-III) was synthesized as below.

[Chem. 25]

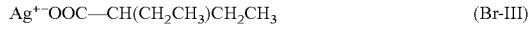

In a darkroom, silver nitrate (0.11 mol, purchased from Wako Pure Chemical Industries, Ltd.) and 2-ethylbutanoic acid (0.10 mol, purchased from Tokyo Chemical Industry Co., Ltd.) were added to water to provide an aqueous solution in which the silver nitrate and the 2-ethylbutanoic acid were mixed with each other. Then, while the aqueous solution was stirred, the aqueous solution was neutralized with a sodium hydroxide aqueous solution (0.09 mol) having a concentration of 1 mol/liter to provide silver 2-ethylbutanoate represented by the chemical formula (Br-III) as a precipitation. The provided precipitation (i.e., the silver 2-ethylbutanoate) was filtered with a filter. The residue was washed with distilled water and subsequently was dried. In this way, the silver 2-ethylbutanoate (0.09 mol) was provided.

(Purchase of KBr)

Potassium bromide represented by the chemical formula KBr was purchased from FUJIFILM Wako Pure Chemical Corporation.

(Preparation of Cold Storage Medium)

The cold storage medium according to the inventive example Br1 was prepared as below. First, the silver 2-ethylbutanoate (40 micromol) and KBr (400 micromol) were added to the TBA-2-EBA aqueous solution (TBA-2-EBA: 9,785 micromol) to provide a mixture. The mixture was stirred. Note that silver carboxylate such as silver 2-ethylbutanoate is insoluble in both a hydrophilic solvent (e.g., water) and a hydrophobic solvent (e.g., oil); however, the silver carboxylate is soluble in a quaternary ammonium salt aqueous solution.

Just after the addition, the aqueous solution got cloudy; however, after several hours, the aqueous solution became transparent. Precipitation was slightly observed in the aqueous solution. The aqueous solution was left at a room temperature over 24 hours. In this way, the cold storage medium according to the inventive example Br1 was prepared. As is clear from above, the cold storage medium according to the inventive example Br1 has a composition shown in the following Table 27.

TABLE 27

| Name of Material | Amount |
|---|---|
| Tetrabutylammonium ions | 9,785 micromol |
| 2-ethylbutanoic acid ions | 40 micromol |
| Silver ions | 40 micromol |
| Bromide ions | 400 micromol |
| Potassium ions | 400 micromol |
| Water (derived from TBA-2-EBA aqueous solution) | Approximately 361,100 micromol |

(Measurement of Melting Point and Latent Heat Amount)

The melting point and the latent heat amount of the cold storage medium according to the inventive example Br1 were measured as below with a differential scanning calorimeter. First, the cold storage medium according to the inventive example Br1 (10 milligrams) was put into a container formed of aluminum. Then, the container was sealed with a lid.

The container was set in a differential scanning calorimeter (purchased from PerkinElmer, trade name: DSC-8500). The cold storage medium put in the container was cooled from a room temperature to minus 20 degrees Celsius at a rate of 2 degrees Celsius/minute. Then, the cold storage medium was left at rest at a temperature of minus 20 degrees Celsius for five minutes. In this way, the present inventors believed that the cold storage medium crystallized to be a semiclathrate hydrate. Finally, the cold storage medium was warmed from minus 20 degrees Celsius to a room temperature at a rate of 2 degrees Celsius/minute. In this way, the crystallized cold storage medium was melted.

On the basis of an endothermic peak output from the differential scanning calorimeter in a period during which the cold storage medium (namely, the semiclathrate hydrate cold storage medium) was melted, the melting point of the cold storage medium according to the inventive example Br1 was identified and the latent heat amount of the cold storage medium according to the inventive example Br1 was calculated. As a result, the melting point of the cold storage medium according to the inventive example Br1 was 7 degrees Celsius. The latent heat amount of the cold storage medium according to the inventive example Br1 was approximately 170 joules/gram.

(Measurement of Supercooling Degree ΔT)

The supercooling degree ΔT of the cold storage medium according to the inventive example Br1 was measured as below. First, the cold storage medium according to the inventive example Br1 (10 grams) was put into a glass bottle having a volume of 60 milliliters. Then, the glass bottle was sealed with a lid.

The glass bottle was put into a thermostat bath (purchased from ESPEC Corp., trade name: SU-241). The temperature in the thermostat bath was 20 degrees Celsius.

After the temperature in the thermostat bath was lowered to 4 degrees Celsius at a rate of minus 1 degree Celsius/minute, the temperature in the thermostat bath was maintained at 4 degrees Celsius.

When zero minutes elapsed from the beginning of the maintenance of the temperature in the thermostat bath at 4 degrees Celsius, (namely, concurrently with the beginning of the maintenance), the cold storage medium according to the inventive example Br1 crystallized spontaneously. With the crystallization, the cold storage medium according to the inventive example Br1 released crystallization heat. Due to the release of the crystallization heat, the temperature of the cold storage medium according to the inventive example Br1 was raised. Finally, the present inventors visually confirmed the completion of the crystallization of the cold storage medium according to the inventive example Br1. The period between the beginning and the completion of the crystallization was 9 hours.

As described above, since the cold storage medium according to the inventive example Br1 crystallized spontaneously at a temperature of 4 degrees Celsius, the cold storage medium according to the inventive example Br 1 had a supercooling degree ΔT of 3 Kelvin (=(the melting point of 7 degrees Celsius)−(the crystallization point of 4 degrees Celsius).

Inventive Example Br2

In the inventive example Br2, an experiment similar to the inventive example Br1 was performed except that TBA-F (20 micromol) represented by the chemical formula (Br-IV) was further added to the cold storage medium. Since TBA-F (purchased from Sigma Aldrich) was crystallized at room temperature, the TBA-F was melted in a thermostat bath maintained at 60 degrees Celsius. Then, the melted TBA-F was added to the cold storage medium according to the inventive example Br1.

[Chem. 26]

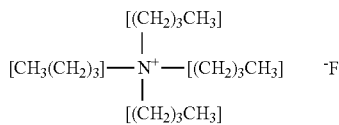

(Br-IV)

Inventive Example Br3

In the inventive example Br3, an experiment similar to the inventive example Br1 was performed except for the following two matters (i) and (ii).
(i) TBA-F (20 micromol) was further added.
(ii) Tributylamine (purchased from Tokyo Chemical Industry Co., Ltd.) represented by the following chemical formula (Br-V) was further added to the cold storage material.

[Chem. 27]

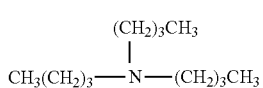

(Br-V)

The following Tables 28-29 show the results of the inventive examples Br1-Br3.

TABLE 28

| Composition | | Latent heat amount (J/gram) | Melting point (° C.) |
|---|---|---|---|
| Inventive example Br1 | TBA-2-EBA: 9,785 micromol Silver 2-ethylbutanoate 40 micromol KBr 400 micromol Water: approximately 361,100 micromol | 170 | 7 |
| Inventive example Br2 | TBA-2-EBA: 9,785 micromol Silver 2-ethylbutanoate 40 micromol KBr 400 micromol TBA-F 20 micromol Water: approximately 361,100 micromol | 172 | 7 |
| Inventive example Br3 | TBA-2-EBA: 9,785 micromol Silver 2-ethylbutanoate 40 micromol KBr 400 micromol TBA-F 20 micromol Tributylamine 100 micromol Water: approximately 361,100 micromol | 170 | 7 |

TABLE 29

| | ΔT (Kelvin) | Crystallization Start time (minute) | Crystallization Completion time (minute) | Period between the crystallization start time and the crystallization completion time (minute) |
|---|---|---|---|---|
| Inventive example Br1 | 3 | 0 | 9 | 9 |
| Inventive example Br2 | 3 | 0 | 9 | 9 |
| Inventive example Br3 | 3 | 0 | 9 | 9 |

Comparative Example Br1

In the comparative example Br1, an experiment similar to the inventive example Br1 was performed, except that neither the silver 2-butylbutanoate nor KBr was not used.

Comparative Example Br2

In the comparative example Br2, an experiment similar to the inventive example Br1 was performed, except that the silver 2-butylbutanoate was not used.

Comparative Example Br3

In the comparative example Br3, an experiment similar to the inventive example Br1 was performed, except for the following two matters (I) and (II).
(I) Neither the silver 2-butylbutanoate nor KBr was used.
(II) TBA-F (400 micromol) was further added.

Comparative Example I

In the comparative example I, an experiment similar to the inventive example Br1 was performed, except that tetra-n-butylammonium iodide (purchased from Tokyo Chemical Industry Co., Ltd., hereinafter, referred to as "TBA-I", 400 micromol) was used in place of KBr The following Tables 30-31 shows the results of the comparative examples Br1-Br3 and the comparative example I. The cold storage media according to the comparative examples Br1-Br3 and the comparative example I did not crystallize. Therefore, the supercooling degrees $\Delta T$ thereof were not calculated.

TABLE 30

| | Composition | Latent heat amount (J/gram) | Melting point (° C.) |
|---|---|---|---|
| Comparative example Br1 | TBA-2-EBA: 9,785 micromol Water: approximately 361,100 micromol | 173 | 7 |
| Comparative example Br2 | TBA-2-EBA: 9,785 micromol KBr 400 micromol Water: approximately 361,100 micromol | 171 | 7 |
| Comparative example Br3 | TBA-2-EBA: 9,785 micromol TBA-F 400 micromol Water: approximately 361,100 micromol | 175 | 13 |
| Comparative example I | TBA-2-EBA: 9,785 micromol Silver 2-ethylbutanoate 40 micromol TBA-I 400 micromol Water: approximately 361,100 micromol | 177 | 7 |

TABLE 31

| | $\Delta T$ (Kelvin) | Crystallization Start time (minute) | Crystallization Completion time (minute) | Period between the crystallization start time and the crystallization completion time (minute) |
|---|---|---|---|---|
| Comparative example Br1 | — | Not crystallized | — | — |
| Comparative example Br2 | — | Not crystallized | — | — |
| Comparative example Br3 | — | Not crystallized | — | — |
| Comparative example Br4 | — | Not crystallized | — | — |

As is clear from Tables 28-31, the cold storage media according to the inventive examples Br1-Br3, each of which contain three compositions of silver ions, bromide ions, and carboxylic acid ions, have a melting point of 7 degrees Celsius and a supercooling degree $\Delta T$ of 3 degrees Kelvin.

On the other hand, as is clear from the comparative examples Br1-Br3, the composition which does not contain silver ions has a melting point of approximately 7-13 degrees Celsius; however, fails to crystallize. For this reason, the composition fails to serve as a cold storage medium.

As is clear from the comparative example I, the composition which contains iodide ions in place of bromide ions fails to crystallize. For this reason, the composition fails to serve as a cold storage medium.

Comparative Example X1-Comparative Example X2

In the comparative example X1, the cold storage medium was composed of TBA-Cl, AgCl, and water. The latent heat amount and the melting point of the cold storage medium according to the comparative example X1 were measured similarly to the above. As a result, the latent heat amount and the melting point of the cold storage medium according to the comparative example X1 were 214 J/gram and 15 degrees Celsius, respectively. Since each of the supercooling degrees $\Delta T$ of the inventive examples C11-C14 and CI9 was 1 Kelvin, the cold storage medium according to the comparative example X1 was cooled at a temperature of 14 degrees Celsius (=15 degrees Celsius−1 degree Celsius).

In the comparative example X2, the cold storage medium was composed of TBA-Br, AgBr, and water. The latent heat amount and the melting point of the cold storage medium according to the comparative example X2 were measured similarly to the above. As a result, the latent heat amount and the melting point of the cold storage medium according to the comparative example X2 were 201 J/gram and 12 degrees Celsius, respectively. The cold storage medium according to the comparative example X2 was cooled at a temperature of 11 degrees Celsius.

The following Tables 32-33 show the results of the comparative examples X1-X2. The cold storage media according to the comparative examples X1-X2 did not crystallize. Therefore, the supercooling degrees ΔT thereof were not calculated.

|  |  | Latent heat amount (J/gram) | Melting point (° C.) |
|---|---|---|---|
| Comparative example X1 | TBA-Cl 12.59355 mmol AgCl 0.040 mmol Water 361.1111 mmol | 214 | 15 |
| Comparative example X2 | TBA-Br 12.40772 mmol AgBr 0.040 mmol Water 333.3333 mmol | 201 | 12 |

|  | ΔT (Kelvin) | Crystallization Start time (minute) | Crystallization Completion time (minute) | Period between the crystallization start time and the crystallization completion time (minute) |
|---|---|---|---|---|
| Comparative example X1 | — | Not crystallized | — | — |
| Comparative example X2 | — | Not crystallized | — | — |

As is clear from the comparative examples X1-X2, the composition, each of which contains no carboxyl acid anion, fails to crystallize. For this reason, the composition fails to serve as a cold storage medium.

INDUSTRIAL APPLICABILITY

The cold storage medium according to the present invention can be used suitably for a refrigerator.

The invention claimed is:

1. A cold storage medium, containing:
tetra-n-butylammonium ions;
silver ions;
at least one kind of halide ions selected from the group consisting of fluoride ions, chloride ions, and bromide ions;
water; and
at least one kind of carboxylic acid ions each represented by the following chemical formula (I), $$R\text{—}COO^-  \qquad (I)$$

where R represents a hydrocarbon group.
2. The cold storage medium according to claim 1, wherein the at least one kind of carboxylic acid ions includes two or more kinds of carboxylic acid ions.
3. The cold storage medium according to claim 1, wherein each of the at least one kind of the carboxylic acid ions has a carbon number of not less than 1 and not more than 10.
4. The cold storage medium according to claim 3, wherein each of the at least one kind of the carboxylic acid ions has a carbon number of not less than 1 and not more than 7.
5. The cold storage medium according to claim 4, wherein a molar ratio of the at least one kind of halide ions to the silver ions is not less than 5 and not more than 20.
6. The cold storage medium according to claim 5, wherein the molar ratio of the at least one kind of halide ions to the silver ions is not less than 7.5 and not more than 15.
7. The cold storage medium according to claim 1, wherein the at least one kind of carboxylic acid ions is selected from the group consisting of pentanoic acid ions, hexanoic acid ions, heptanoic acid ions, methylbutanoic acid ions, ethylbutanoic acid ions, methylpentanoic acid ions, ethylpentanoic acid ions, propylpentanoic acid ions, methylhexanoic acid ions, ethylhexanoic acid ions, propylhexanoic acid ions, and butylhexanoic acid ions.
8. The cold storage medium according to claim 1, wherein the at least one kind of carboxylic acid ions is selected from the group consisting of pentanoic acid ions, heptanoic acid ions, methylbutanoic acid ions, and ethylbutanoic acid ions.
9. The cold storage medium according to claim 1, wherein the cold storage medium has a melting point of not less than 3 degrees Celsius and not more than 10 degrees Celsius.
10. The cold storage medium according to claim 9, wherein the cold storage medium has a melting point of not less than 4 degrees Celsius and not more than 7 degrees Celsius.
11. The cold storage medium according to claim 9, wherein the following mathematical formula (II) is satisfied:

$$\Delta T \leq 5 \text{ degrees Kelvin} \qquad (II)$$

where
ΔT represents a temperature difference between the melting point of the cold storage medium and a temperature at which the cold storage medium under a supercooling state begins to crystallize spontaneously.

12. The cold storage medium according to claim 11, wherein

ΔT is not more than 2 degrees Kelvin.

13. The cold storage medium according to claim 11, wherein the temperature at which the cold storage medium under the supercooling state begins to crystallize spontaneously is not less than 3 degrees Celsius and not more than 7 degrees Celsius.

* * * * *